(12) United States Patent
Kaino

(10) Patent No.: US 10,962,640 B2
(45) Date of Patent: Mar. 30, 2021

(54) RADAR DEVICE AND CONTROL METHOD OF RADAR DEVICE

(71) Applicant: FUJITSU TEN LIMITED, Kobe (JP)

(72) Inventor: Shozo Kaino, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 470 days.

(21) Appl. No.: 15/619,902

(22) Filed: Jun. 12, 2017

(65) Prior Publication Data

US 2017/0363738 A1 Dec. 21, 2017

(30) Foreign Application Priority Data

Jun. 17, 2016 (JP) .............................. JP2016-120885
Apr. 21, 2017 (JP) .............................. JP2017-084796

(51) Int. Cl.
*G01S 13/931* (2020.01)
*G01S 13/34* (2006.01)
(Continued)

(52) U.S. Cl.
CPC ............ *G01S 13/931* (2013.01); *G01S 13/32* (2013.01); *G01S 13/343* (2013.01); *G01S 13/536* (2013.01); *G01S 13/584* (2013.01); *G01S 2013/9321* (2013.01); *G01S 2013/93271* (2020.01)

(58) Field of Classification Search
CPC .................. G01S 13/931; G01S 13/32; G01S 2013/9375; G01S 13/584; G01S 13/536; G01S 13/343; G01S 2013/9321
See application file for complete search history.

(56) References Cited

U.S. PATENT DOCUMENTS 7,409,295 B2 *   8/2008   Paradie .................... G06T 7/70
                                                                701/301
8,269,652 B2 *   9/2012   Seder ................... G01S 13/723
                                                                340/435
(Continued)

FOREIGN PATENT DOCUMENTS

JP        2010-197133 A     9/2010
JP        2014-010095 A     1/2014
(Continued)

*Primary Examiner* — Matthew M Barker
(74) *Attorney, Agent, or Firm* — Oliff PLC

(57) ABSTRACT

A radar device derives, plurality of parameters according to a target and target detection distances, based of received signals that are acquired by receiving reflected waves, each of which is a radar transmission wave transmitted toward vicinity of an own vehicle and then reflected from the target existing in the vicinity. The radar device computes, from likelihood models in which first and second already-known correlations are modeled for each of the detection distances, an indicator based on likelihood ratios, which correspond to derived parameters and detection distances, of a stationary vehicle and upper object, in which the first already-known correlations correlate parameters and likelihoods of the stationary vehicle with each other and second already-known correlations correlate the parameters and likelihoods of the upper object with each other. The radar device performs a threshold determination on the computed indicators to determine whether the target is the stationary vehicle or upper object.

19 Claims, 25 Drawing Sheets

(51) Int. Cl.
*G01S 13/536* (2006.01)
*G01S 13/58* (2006.01)
*G01S 13/32* (2006.01)

(56) References Cited

U.S. PATENT DOCUMENTS

| | | | | |
|---|---|---|---|---|
| 9,424,750 | B2 * | 8/2016 | Hayashi | G01S 13/931 |
| 9,470,790 | B2 * | 10/2016 | Inomata | G08G 1/166 |
| 2015/0210280 | A1 * | 7/2015 | Agnew | B60W 30/09 |
| | | | | 701/48 |
| 2017/0031019 | A1 * | 2/2017 | Mandava | G01S 13/931 |
| 2019/0001971 | A1 * | 1/2019 | Nguyen Van | G01S 7/40 |

FOREIGN PATENT DOCUMENTS

| | | |
|---|---|---|
| JP | 2015-114261 A | 6/2015 |
| JP | 2016-006383 A | 1/2016 |

* cited by examiner

STATIONARY VEHICLE

| DISTANCE R [m] | NORMAL DETECTION LIKELIHOOD LOGARITHM | HISTORY ABSENCE LIKELIHOOD LOGARITHM | PEAK ABSENCE LIKELIHOOD LOGARITHM | ANGLE ABSENCE LIKELIHOOD LOGARITHM | CONTINUITY ABSENCE LIKELIHOOD LOGARITHM | ESTIMATED-BIN GAP LIKELIHOOD LOGARITHM | MAHALANOBIS DISTANCE NG LIKELIHOOD LOGARITHM | PAIR ABSENCE LIKELIHOOD LOGARITHM |
|---|---|---|---|---|---|---|---|---|
| 40≤R≤45 | -0.03 | ... | ... | ... | ... | ... | ... | ... |
| 45<R≤55 | ... | - | ... | ... | ... | ... | ... | - |
| 55<R≤65 | ... | ... | ... | ... | ... | ... | ... | ... |
| 65<R≤75 | ... | - | ... | ... | ... | ... | ... | - |
| 75<R≤85 | ... | ... | ... | ... | ... | ... | ... | ... |
| 85<R≤95 | ... | - | ... | ... | ... | ... | ... | - |
| 95<R≤105 | -0.04 | -2.48 | ... | ... | ... | ... | ... | ... |
| 105<R≤115 | ... | - | ... | ... | ... | ... | ... | - |
| 115<R≤125 | ... | ... | ... | ... | ... | ... | ... | ... |
| 125<R≤135 | ... | - | ... | ... | ... | ... | ... | - |

UPPER OBJECT

| DISTANCE R [m] | NORMAL DETECTION LIKELIHOOD LOGARITHM | HISTORY ABSENCE LIKELIHOOD LOGARITHM | PEAK ABSENCE LIKELIHOOD LOGARITHM | ANGLE ABSENCE LIKELIHOOD LOGARITHM | CONTINUITY ABSENCE LIKELIHOOD LOGARITHM | ESTIMATED-BIN GAP LIKELIHOOD LOGARITHM | MAHALANOBIS DISTANCE NG LIKELIHOOD LOGARITHM | PAIR ABSENCE LIKELIHOOD LOGARITHM |
|---|---|---|---|---|---|---|---|---|
| 40≤R≤45 | -0.23 | ... | ... | ... | ... | ... | ... | ... |
| 45<R≤55 | ... | - | ... | ... | ... | ... | ... | - |
| 55<R≤65 | ... | ... | ... | ... | ... | ... | ... | ... |
| 65<R≤75 | ... | - | ... | ... | ... | ... | ... | - |
| 75<R≤85 | ... | ... | ... | ... | ... | ... | ... | ... |
| 85<R≤95 | ... | - | ... | ... | ... | ... | ... | - |
| 95<R≤105 | -0.16 | -1.13 | ... | ... | ... | ... | ... | ... |
| 105<R≤115 | ... | - | ... | ... | ... | ... | ... | - |
| 115<R≤125 | ... | ... | ... | ... | ... | ... | ... | ... |
| 125<R≤135 | ... | - | ... | ... | ... | ... | ... | - |

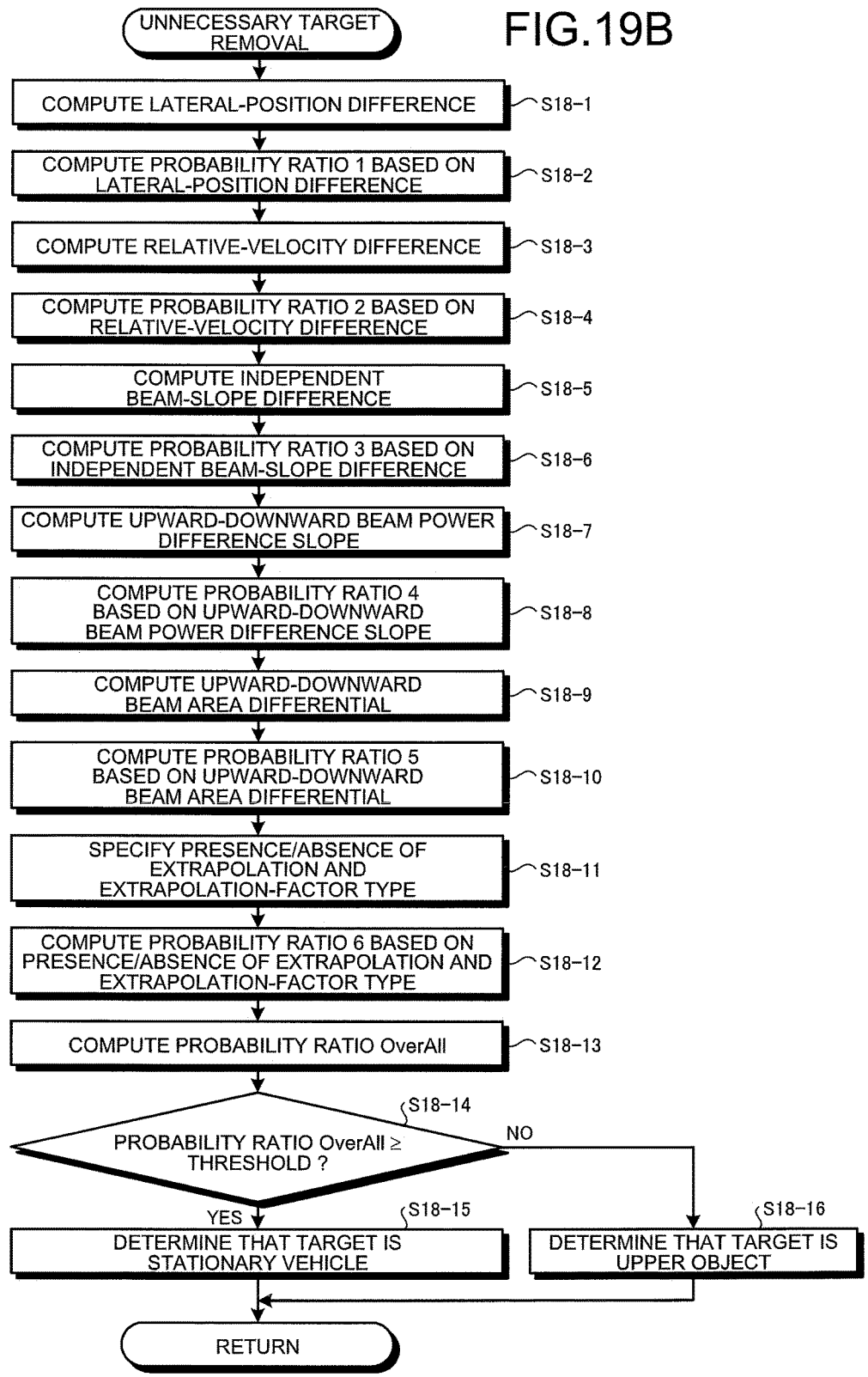

RADAR DEVICE AND CONTROL METHOD OF RADAR DEVICE

CROSS-REFERENCE TO RELATED APPLICATION

This application is based upon and claims the benefit of priority of the prior Japanese Patent Application No. 2016-120885, filed on Jun. 17, 2016; and Japanese Patent Application No. 2017-084796, filed on Apr. 21, 2017, the entire contents of both of which are incorporated herein by reference.

FIELD

The embodiments discussed herein are directed to a radar device and a control method of the radar device.

BACKGROUND

Conventionally, a radar device provided in the front side etc. of a body of a vehicle outputs transmission waves within an external transmission range of the vehicle, receives a reflected wave from a target so as to derive target data including position information etc. of the target, thereby discriminating, by using the target data, a stationary vehicle etc. positioning at the forward of the vehicle. The vehicle controlling device provided in the vehicle acquires, from the radar device, information on the stationary vehicle and the like so as to control a behavior of the vehicle based on this information, and avoids a collision with, for example, the stationary vehicle and the like, thereby providing a safe and comfortable travel to a user of the vehicle (see Japanese Laid-open Patent Publication No. 2016-006383, for example).

However, the aforementioned conventional technology has a problem that discriminant precision between a stationary vehicle and an upper object is insufficient, and thus the upper object may be erroneously detected as the stationary vehicle.

SUMMARY

A radar device according to an aspect of an embodiment includes a deriving unit, a computation unit, and a determination unit. The deriving unit derives a plurality of parameters according to a target and detection distances of the target on the basis of received signals that are acquired by receiving reflected waves. Each of the reflected waves is a radar transmission wave transmitted toward a vicinity of an own vehicle and then reflected from the target existing in the vicinity. The computation unit computes a first indicator from likelihood models in which first and second already-known correlations are modeled for each of the detection distances. The first indicator is based on ratios of: (i) likelihoods of a target existing in a traveling direction of the own vehicle and being to collide with the own vehicle when the own vehicle proceeds in the traveling direction; and (ii) likelihoods of a target existing in the traveling direction of the own vehicle and not being to collide with the own vehicle when the own vehicle proceeds in the traveling direction. The ratios are corresponding to the parameters and the detection distances derived by the deriving unit. The first already-known correlations correlate parameters and the likelihoods of the target that is to collide with the own vehicle with each other, and the second already-known correlations correlate the parameters and the likelihoods of the target that is not to collide with the own vehicle with each other. The determination unit determines whether the target is the target that is to collide with the own vehicle or the target that is not to collide with the own vehicle on the basis of the first indicator computed by the computation unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 18 is a diagram illustrating an extrapolation-factor type likelihood table according to the first embodiment;

FIG. 19B is a flowchart illustrating a subroutine of an unneeded-target removal according to the first embodiment;

DESCRIPTION OF EMBODIMENTS

Hereinafter, embodiments of a radar device and a control method of the radar device will be described in detail with reference to the accompanying drawings. Moreover, the embodiments described below are merely one example, and not intended to limit the present application. The embodiments described below mainly indicate configurations and processes according to the disclosed technology, and explanation of other configurations and processes are omitted. Moreover, any of these embodiments and modifications may be appropriately combined within a consistent range. In each of the embodiments, the same reference symbols are provided to the same configuration and processes, and explanation of already-explained configurations and processes is omitted.

First Embodiment

Outline of Target Detection Performed by Radar Device According to First Embodiment A first embodiment discriminates between a stationary vehicle and an upper object, which are to be detected by a radar device, from a point a relatively 80 meters before a target. In other words, in a case where a stationary vehicle and an upper object are to be discriminated by using the same target data, when distributions of target data on the stationary vehicle and the upper object overlaps with each other, the discrimination between both sides based on a threshold is difficult.

Therefore, the first embodiment constructs a statistical model from an already known correlation between values that can be taken by a stationary vehicle and an upper object with respect to a certain parameter, and probabilities based on their occurrence frequency, and computes a stationary-vehicle likelihood and an upper-object likelihood on the basis of the statistical model for each scan by the radar device. Furthermore, updating of the likelihood is performed by using a method of a Bayesian filter for each scan so as to improve a reliability, as well as discrimination between a stationary vehicle and an upper object is performed on the basis of a ratio (logit) between the stationary-vehicle likelihood and the upper-object likelihood. Herein, because the discrimination is not sufficient when only one parameter is used, the first embodiment uses a plurality of parameters that define respective statistical models so as to be able to complement abilities one another. The already known correlations, which are correlating parameters and the likelihoods of the target (for example, stationary vehicle) being to collide with the own vehicle with each other, are one example of first already-known correlations. The already known correlations, which are correlating parameters and the likelihoods of the target (for example, upper object) being not to collide with the own vehicle with each other, are one example of second already-known correlations.

Figure 1:
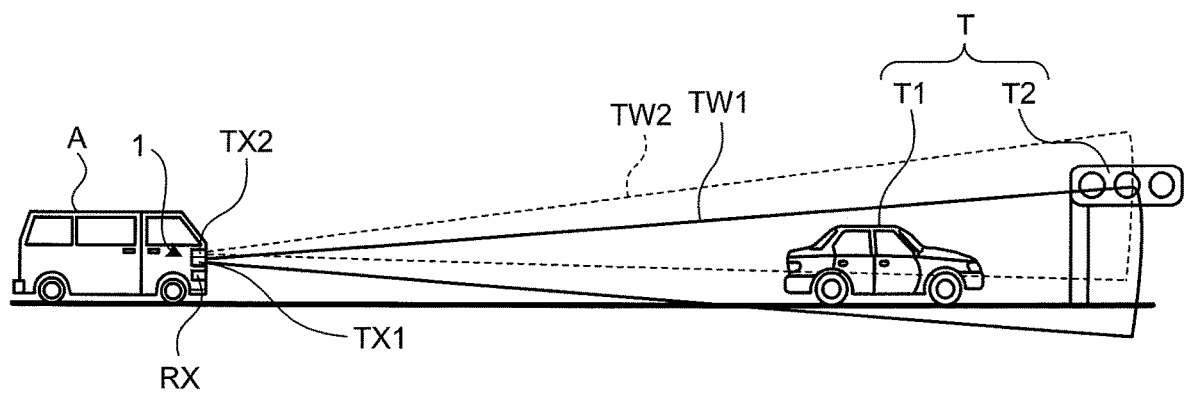
FIG. 1 is a schematic diagram illustrating an outline of a target detection performed by a radar device according to a first embodiment.

FIG. 1 is a schematic diagram illustrating an outline of a target detection performed by a radar device according to the first embodiment. A radar device 1 according to the first embodiment is provided in a forward part of an own vehicle A, such as a radiator grill, so as to detect a target T (targets T1 and T2) existing in a traveling direction of the own vehicle A. The target T includes a moving target and a stationary target. The target T1 illustrated in FIG. 1 is, for example, a preceding vehicle, which is moving along a traveling direction of the own vehicle A, or a stationary object (including stationary vehicle) that is stopped. The target T2 illustrated in FIG. 1 is an upper object other than a vehicle that is stopped, for example, above in the traveling direction of the own vehicle A, such as a traffic light, an overpass, a road sign, and an information sign.

In order to ensure ability even when a perpendicular axis mounted on the radar inclines due to loading or suspensions of the own vehicle A, as illustrated in FIG. 1, the radar device 1 includes a scan radar that alternately transmits a downward-transmission wave TW1 and an upward-transmission wave TW2 for, for example, each 5 msec. A downward-transmission unit TX1 of the radar device 1 transmits the downward-transmission wave TW1 toward a lower side of the traveling direction of the own vehicle A. An upward-transmission unit TX2 of the radar device 1 transmits the upward-transmission wave TW2 toward an upper side of the traveling direction of the own vehicle A. The downward-transmission unit TX1 and the upward-transmission unit TX2 include, for example, an antenna.

As illustrated in FIG. 1, scanning ranges of the downward-transmission wave TW1 and the upward-transmission wave TW2 partly overlap with each other in a perpendicular direction to the own vehicle A, and thus the radar device 1 detects the target T in a wider range in the perpendicular direction than a case where either one of the downward-transmission wave TW1 or the upward-transmission wave TW2 is used. The radar device 1 receives a reflected wave, which is generated by reflection of the downward-transmission wave TW1 and the upward-transmission wave TW2 from the target T, by using a receiving unit RX so as to detect the target T.

Configuration of Radar Device According to First Embodiment

Figure 2:
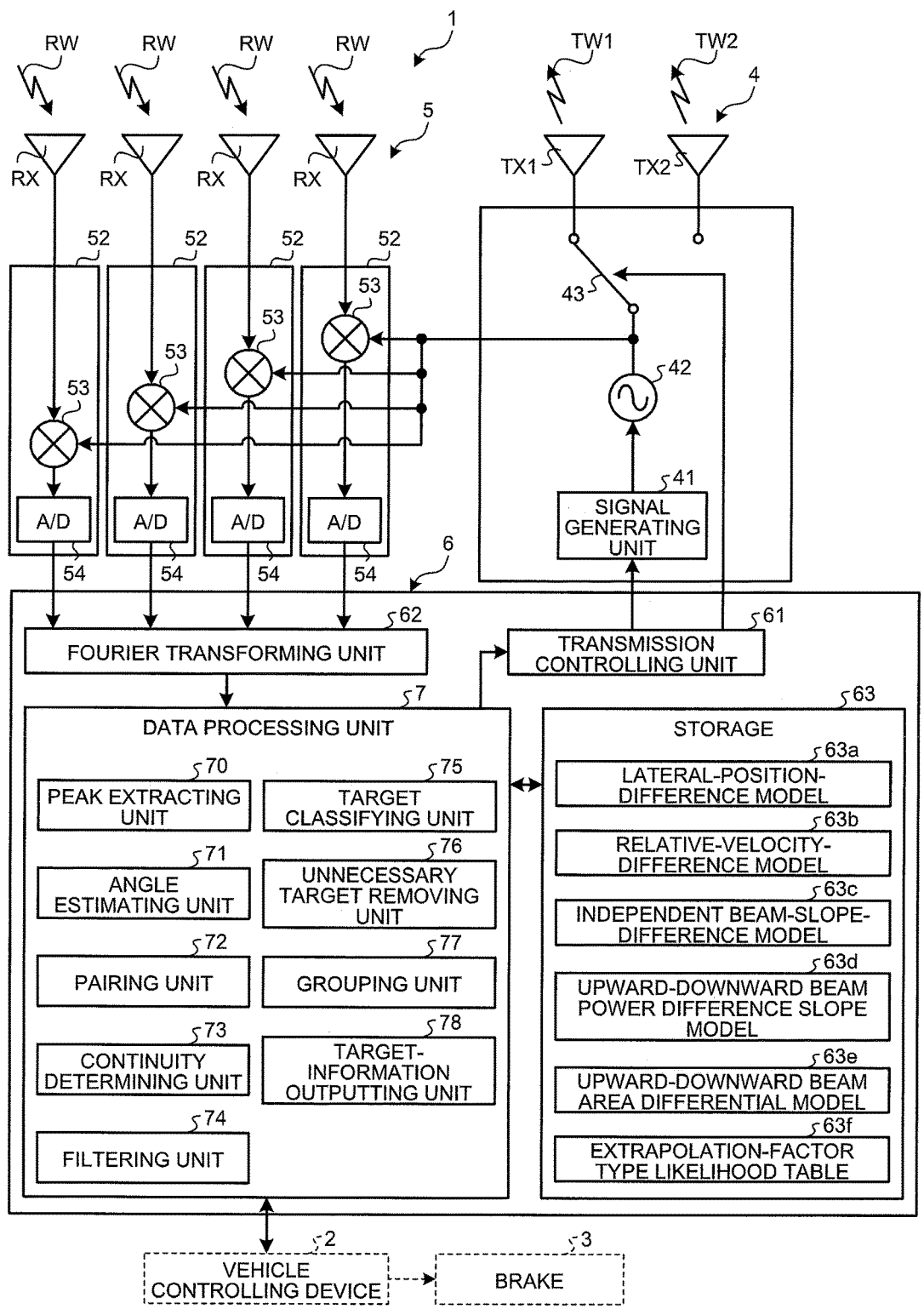
FIG. 2 is a diagram illustrating a configuration of the radar device according to the first embodiment.

FIG. 2 is a diagram illustrating a configuration of the radar device according to the first embodiment. The radar device 1 according to the first embodiment uses, among various types of millimeter-wave radars and the like, an Frequency Modulated-Continuous Wave (FM-CW) that is a frequency-modulated continuous wave so as to detect the target T existing in the vicinity of the own vehicle A.

As illustrated in FIG. 2, the radar device 1 is connected with a vehicle controlling device 2. The vehicle controlling device 2 is connected with a brake 3 and the like. For example, when a traveling distance of a reflected wave from the target T1, generated by reflection of a transmission wave having been irradiated from the radar device 1, which is received by a receiving antenna of the radar device 1, becomes a predetermined distance or less and there exists a fear that the own vehicle A rear-ends the target T1, the vehicle controlling device 2 controls the brake 3, a throttle, gears, and the like so as to control a behavior of the own vehicle A, thereby avoiding the rear-end collision of the own vehicle A with the target T1. As an example of a system that performs such a vehicle control, there exists an Adaptive Cruise Control (ACC) system.

The traveling distance of the reflected wave, from the target T1, generated by reflection of the transmission wave having been irradiated from the radar device 1, which is received by the receiving antenna of the radar device 1, is referred to as "longitudinal distance", and a distance of the target T in a left/right direction (vehicle-width direction) of the own vehicle A is referred to as "lateral distance". The left/right direction of the own vehicle A is a lane-width direction of a road on which the own vehicle A travels. Origin of "lateral distance" is positioned at a center position of the own vehicle A, and right and left sides of the own vehicle A are expressed in respective positive and negative values. Moreover, "lateral distance" is "lateral position" to be mentioned later.

As illustrated in FIG. 2, the radar device 1 includes a transmission unit 4, a receiving unit 5, and a signal processing unit 6.

The transmission unit 4 includes a signal generating unit 41, an oscillator 42, a switch 43, the downward-transmission unit TX1, and the upward-transmission unit TX2. The signal generating unit 41 generates a modulation signal whose voltage changes triangularly, and supplies the modulation signal to the oscillator 42. The oscillator 42 performs frequency modulation on a continuous-wave signal on the basis of the modulation signal generated by the signal generating unit 41 so as to generate a transmission signal whose frequency changes according to the lapse of time, and outputs the transmission signal to the downward-transmission unit TX1 and the upward-transmission unit TX2.

The switch 43 connects one of the downward-transmission unit TX1 and the upward-transmission unit TX2 with the oscillator 42. The switch 43 operates at predetermined timings (for example, for each 5 msec) caused by a control of a transmission controlling unit 61 to be mentioned later so as to switch the connection between the oscillator 42 and one of the downward-transmission unit TX1 and the upward-transmission unit TX2. In other words, the switch 43 sequentially switches the connection of the oscillator 42 with, for example, . . . →the downward-transmission unit TX1→the upward-transmission unit TX2→the downward-transmission unit TX1→the upward-transmission unit TX2 . . . .

The downward-transmission unit TX1 and the upward-transmission unit TX2 respectively transmit the downward-transmission wave TW1 and the upward-transmission wave TW2 toward the outside of the own vehicle A on the basis of the transmission signal. Hereinafter, the downward-transmission unit TX1 and the upward-transmission unit TX2 may be collectively referred to as "transmission unit TX". In FIG. 2, the case is exemplified, in which the number of each of the downward-transmission unit TX1 and the upward-transmission unit TX2 is one, the number may be appropriately changed in accordance with design. The transmission unit TX is constituted of a plurality of antennae so as to output the downward-transmission wave TW1 and the upward-transmission wave TW2 in respective different directions through the plurality of antennae, thereby covering the scanning range. Hereinafter, the downward-transmission wave TW1 and the upward-transmission wave TW2 may be collectively referred to as "transmission wave TW".

The downward-transmission unit TX1 and the upward-transmission unit TX2 are connected with the oscillator 42 through the switch 43. Thus, one of the downward-transmission wave TW1 and the upward-transmission wave TW2 is output from a piece of the transmission unit TX in accordance with a switching operation of the switch 43. The transmission wave TW to be output is sequentially switched by the switching operation of the switch 43.

The receiving unit 5 includes individual receiving units 52 that are connected with the respective receiving units RX including four antennae forming an array antenna. In FIG. 2, the case is exemplified, in which the number of the receiving units RX is four. Alternatively, the number may be appropriately changed in accordance with design. Each of the receiving units RX receives a reflected wave RW from the target T. Each of the individual receiving units 52 processes the reflected wave RW received through the corresponding receiving unit RX.

Each of the individual receiving units 52 includes a mixer 53 and an Analog/Digital converter (A/D converter) 54. A received signal, which is obtained from the reflected wave RW received by the receiving unit RX, is transmitted to the mixer 53. An amplifier may be provided between each of the receiving units RX and the corresponding mixer 53.

A transmission signal distributed from the oscillator 42 of the transmission unit 4 is input to each of the mixers 53, and the mixer 53 mixes the transmission signal and the received signal. Thus, a beat signal is generated, which indicates a beat frequency being a difference frequency between a frequency of the transmission signal and that of the received signal. The beat signal generated by the mixer 53 is converted into a digital signal by the A/D converter 54, and thus is output to the signal processing unit 6.

The signal processing unit 6 is a microcomputer including a Central Processing Unit (CPU), a storage 63, and the like so as to control the whole of the radar device 1. The signal processing unit 6 causes the storage 63 to store various kinds of data to be computed, information on targets detected by a data processing unit 7, etc. The storage 63 stores a lateral-position-difference model 63a, a relative-velocity-difference model 63b, an independent beam-slope-difference model 63c, an upward-downward beam power difference slope model 63d, an upward-downward beam area differential model 63e, and an extrapolation-factor type likelihood table 63f, which are to be mentioned later. For example, an Erasable Programmable Read Only Memory (EPROM), a flash memory, and the like may be used as the storage 63, however, is not limited thereto.

The signal processing unit 6 includes, as functions of software to be realized by the microcomputer, the transmission controlling unit 61, a Fourier transforming unit 62, and the data processing unit 7. The transmission controlling unit 61 controls the signal generating unit 41 of the transmission unit 4, and further controls switching of the switch 43. The data processing unit 7 includes a peak extracting unit 70, an angle estimating unit 71, a pairing unit 72, a continuity determining unit 73, a filtering unit 74, a target classifying unit 75, an unnecessary target removing unit 76, a grouping unit 77, and a target-information outputting unit 78.

The Fourier transforming unit 62 performs a Fast Fourier Transformation (FFT) on a beat signal output from each of the plurality of individual receiving units 52. Thus, the Fourier transforming unit 62 converts the beat signal according to the received signal of each of the plurality of receiving units RX into an frequency spectrum that is data on a frequency range. The frequency spectrum generated by the Fourier transforming unit 62 is output to the data processing unit 7.

The peak extracting unit 70 extracts, in the frequency spectrum generated by the Fourier transforming unit 62, a peak exceeding a predetermined signal level from each of the zones of an up zone in which the frequency of the transmission signal rises and a down zone in which the frequency thereof drops.

Figure 3:
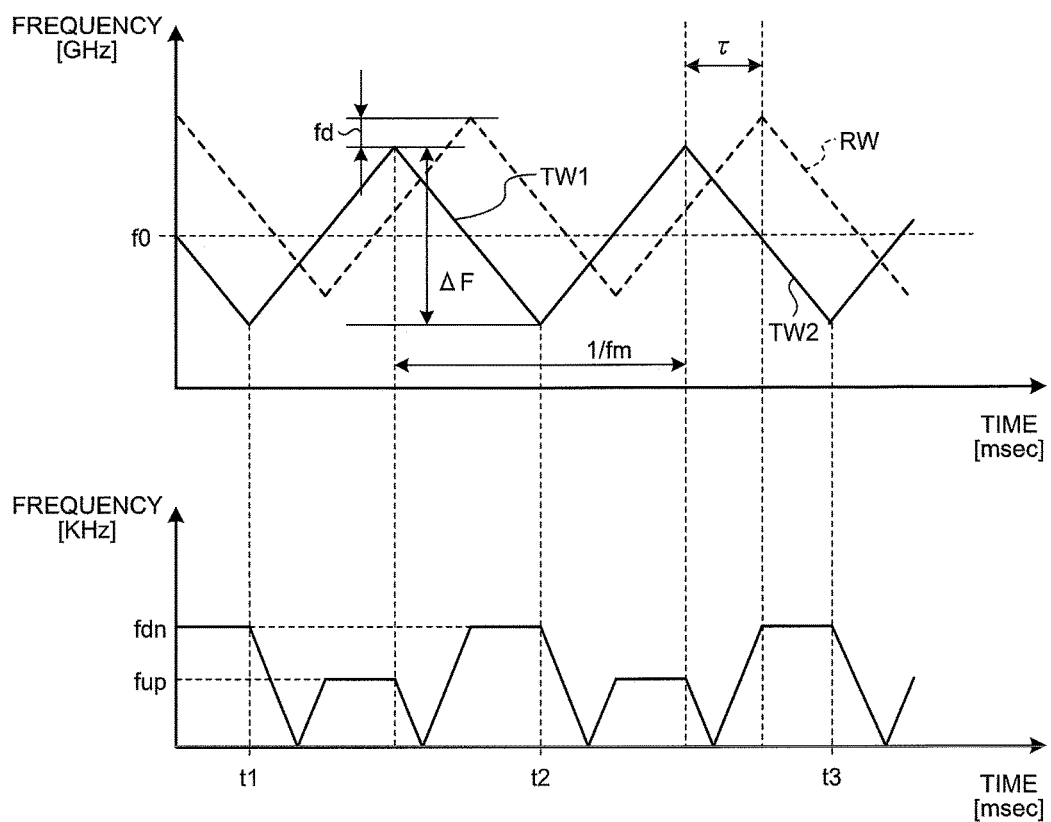
FIG. 3 is a diagram illustrating a relation between a transmission wave and a reflected wave, and a beat signal.
Figure 4A:
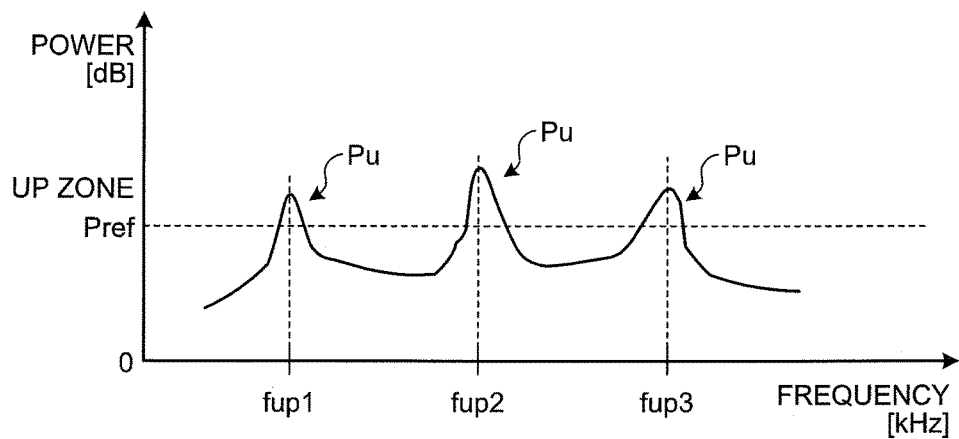
FIG. 4A is a diagram explaining a peak extraction in an up zone.
Figure 4B:
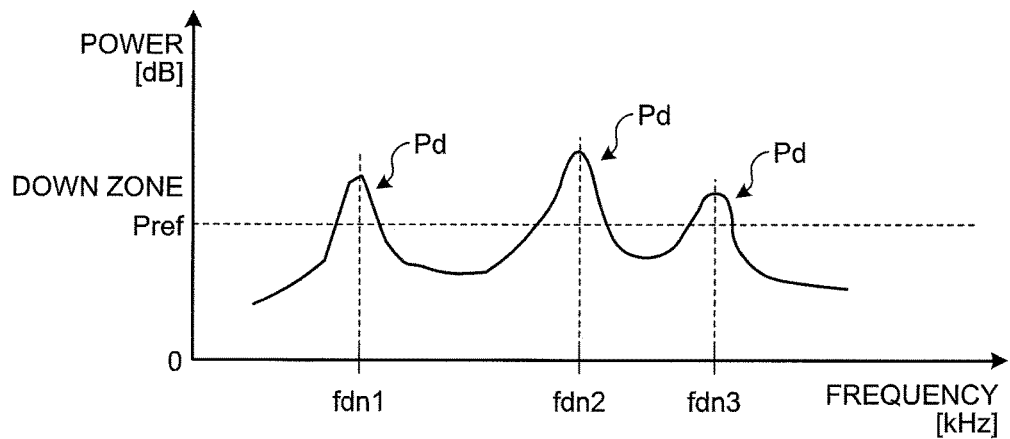
FIG. 4B is a diagram explaining a peak extraction in a down zone.

Herein, processes of the peak extracting unit 70 will be explained with reference to FIGS. 3, 4A, and 4B. FIG. 3 is a diagram illustrating a relation between a transmission wave and a reflected wave, and a beat signal. FIG. 4A is a diagram explaining a peak extraction in an up zone. FIG. 4B is a diagram explaining a peak extraction in a down zone. For the convenience of explanation, the reflected wave RW illustrated in FIG. 3 is assumed to be an ideal reflected wave from the one target T. In FIG. 3, the transmission wave TW is indicated by solid lines, and the reflected wave RW is indicated by dashed lines.

In an upper part of FIG. 3, a vertical axis indicates a frequency [GHz], and a horizontal axis indicates a time [msec]. In FIG. 3, the downward-transmission wave TW1 is assumed to be output during a zone from a timing t1 to a timing t2, and the upward-transmission wave TW2 is assumed to be output during a zone from the timing t2 to a timing t3.

As illustrated in FIG. 3, each of the downward-transmission wave TW1 and the upward-transmission wave TW2 is a continuous wave whose frequency goes up and down with a predetermined period from a predetermined frequency, and the frequency linearly changes in accordance with a time. Herein, a center frequency between the downward-transmission wave TW1 and the upward-transmission wave TW2 is "f0", a change width of the frequency is "$\Delta F$", and an inverse number of one period in which the frequency goes up and down is "fm".

The reflected wave RW is generated by reflection of the downward-transmission wave TW1 and the upward-transmission wave TW2 from the target T, and thus, similarly to the downward-transmission wave TW1 and the upward-transmission wave TW2, becomes a continuous wave whose frequency goes up and down from a predetermined center frequency with a predetermined period. However, a delay is generated in the reflected wave RW for the downward-transmission wave TW1 and the like. A delay time τ corresponds to a longitudinal distance from the own vehicle A to the target T.

A frequency shift by a frequency fd is generated in the reflected wave RW from that of the transmission wave TW caused by Doppler effect according to a relative velocity of the target T to the own vehicle A.

Thus, the frequency shift according to the relative velocity as well as the delay time according to the longitudinal distance is generated in the reflected wave RW related to the downward-transmission wave TW1 and the like. Therefore, as illustrated in a lower part of FIG. 3, a value of a beat frequency of the beat signal to be generated in the mixer 53 differ between an up zone (hereinafter, may be referred to as "UP"), in which the frequency of the transmission signal rises, and a down zone (hereinafter, may be referred to as "DN"), in which the frequency of the transmission signal drops.

The beat frequency is a frequency of a difference between a frequency of the downward-transmission wave TW1 and the like and that of the reflected wave RW.

Hereinafter, a beat frequency of an up zone is referred to as "fup", and that of a down zone is referred to as "fdn". In the lower part of FIG. 3, a vertical axis indicates a frequency [kHz], and a horizontal axis indicates a time [msec].

As illustrated in FIGS. 4A and 4B, after Fourier conversion by the Fourier transforming unit 62, a waveform is obtained in a frequency range of each of the beat frequency fup of the up zone and the beat frequency fdn of the down zone. In FIGS. 4A and 4B, a vertical axis indicates a signal power [dB], and a horizontal axis indicates a frequency [kHz].

In a waveform illustrated in FIGS. 4A and 4B, the peak extracting unit 70 extracts peaks Pu and peaks Pd that exceed a predetermined signal power Pref. The peak extracting unit 70 extracts the peaks Pu and Pd with respect to each of the downward-transmission wave TW1 and the upward-transmission wave TW2 illustrated in FIG. 3. The predetermined signal power Pref may be constant or variable. The value of the predetermined signal power Pref may be set to be different between an up zone and a down zone.

In the frequency spectrum of the up zone illustrated in FIG. 4A, the peaks Pu appear at respective positions of three frequencies fup1, fup2, and fup3. In the frequency spectrum of the down zone illustrated in FIG. 4B, the peaks Pd appear at respective positions of three frequencies fdn1, fdn2, and fdn3. In FIGS. 4A and 4B, the three peaks Pu and the three peaks Pd are exemplified, the number of the peaks Pu or the peaks Pd that are to appear is one or more. Hereinafter, a frequency may be referred to as "bin" that is in another unit, and 1 bin corresponds to approximately 467 Hz.

Not considering a relative velocity, a frequency of a position where a peak appears in the frequency spectrum corresponds to a longitudinal distance of the target T. 1 bin corresponds to approximately 0.36 meters of the longitudinal distance. When, for example, a frequency spectrum of an up zone is focused on, it is found that a target exists at a position of a longitudinal distance corresponding to a frequency fup at which the peak Pu appears. Thus, the peak extracting unit 70 extracts frequencies at which the peak Pu and the peak Pd having respective powers exceeding the predetermined signal power Pref appear in frequency spectra of both the up zone and the down zone. Hereinafter, a frequency to be extracted in such a manner may be referred to as "peak frequency".

The frequency spectra of an up zone and a down zone, which are illustrated in FIGS. 4A and 4B, are obtained from a received signal that is received by one of the receiving units RX. Therefore, the Fourier transforming unit 62 derives frequency spectra of the up zone and the down zone from each of the received signals that are received by the four receiving units RX.

Each of the four receiving units RX receives the reflected wave RW from the same target, and thus, between the frequency spectra of the four receiving units RX, peak frequencies to be extracted are of the same. On the other hand, positions of the four receiving units RX differ from one another, and thus phases of the reflected wave RW of the respective receiving units RX differ from one another. Thus, pieces of phase information on the same bin of the respective received signals differ from one another for each of the receiving units RX. When a plurality of targets exists at different angles having the same bin, a signal of one peak frequency in a frequency spectrum includes information on the plurality of targets.

The angle estimating unit 71 performs an azimuth computing process to disconnect information on the plurality of targets existing at the same bin from a signal of one peak frequency for each of the up zone and the down zone, and estimates angles of the plurality of targets, respectively. The targets existing at the same bin are targets whose longitudinal distances are of approximately the same. The angle estimating unit 71 attends to received signals having the same bin in all of the frequency spectra of the four receiving units RX, and estimates an angle of a target on the basis of phase information on these received signals.

As such a method for estimating an angle of a target, a common angle estimating method can be employed, such as an Estimation of Signal Parameters via Rotational Invariance Techniques (ESPRIT), a Multiple Signal Classification (MUSIC), and a Panchromatic Remote-sensing Instrument for Stereo Mapping (PRISM). Thus, the angle estimating unit 71 computes, from a signal of one frequency, a plurality of peak angles and signal powers of these respective angles.

Figure 5:
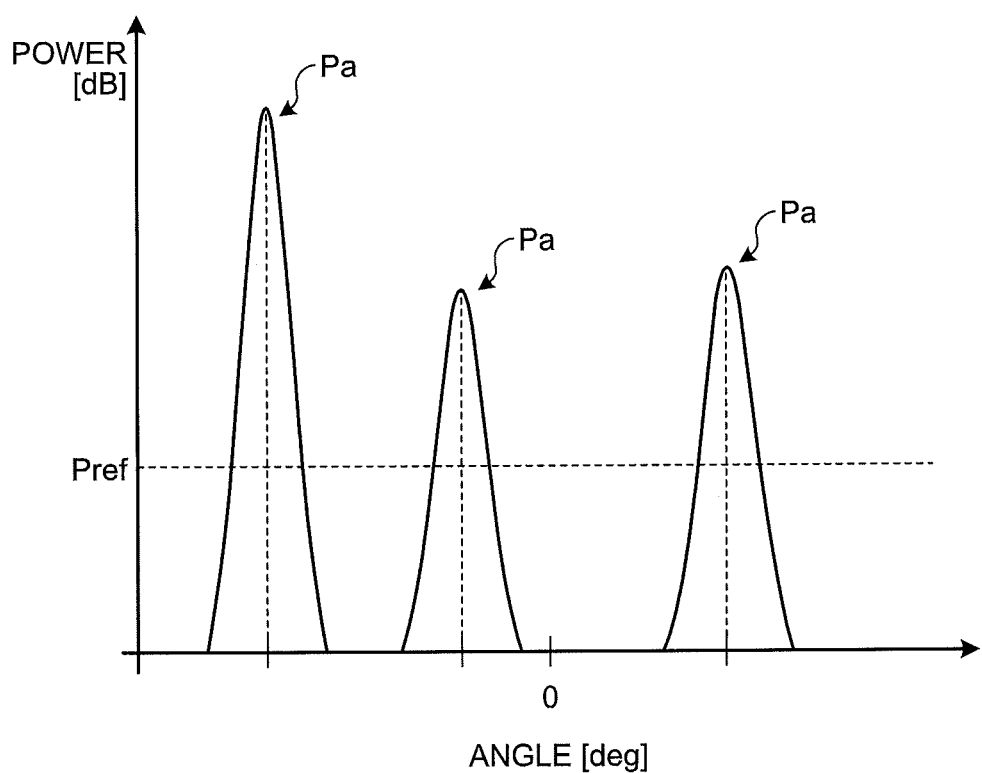
FIG. 5 is a diagram conceptually illustrating an angle estimated by an azimuth computing process as an angle spectrum.

FIG. 5 is a diagram conceptually illustrating an angle estimated by an azimuth computing process as an angle spectrum. In FIG. 5, a vertical axis indicates a signal power [dB], and a horizontal axis indicates an angle [deg]. In an angle spectrum, an angle estimated by the azimuth computing process appears as a peak Pa that exceeds the predetermined signal power Pref. Hereinafter, an angle estimated by the azimuth computing process may be referred to as "peak angle". The plurality of peak angles simultaneously derived from a signal of one peak frequency indicates angles of a plurality of targets existing at the same bin.

The angle estimating unit 71 performs such a derivation of peak angles on all of the peak frequencies in frequency spectra of the up zone and the down zone.

The peak extracting unit 70 and the angle estimating unit 71 derive, by the aforementioned process, peak data, which correspond to respective targets existing ahead of the own vehicle A, in each of the up zone and the down zone. The peak data includes parameters of the aforementioned peak frequency, the peak angle, the signal power of the peak angle (hereinafter, may be referred to as "angle power"), etc.

Figure 6A:
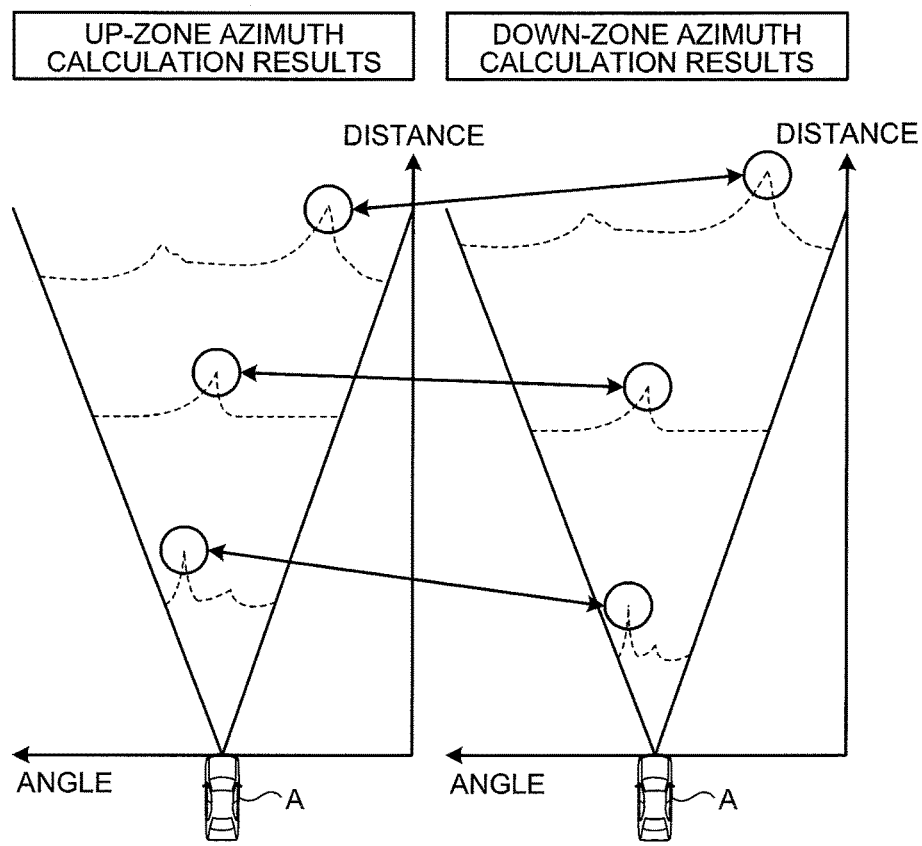
FIG. 6A is a diagram explaining pairing based on azimuth angles and angle powers in up and down zones.
Figure 6B:
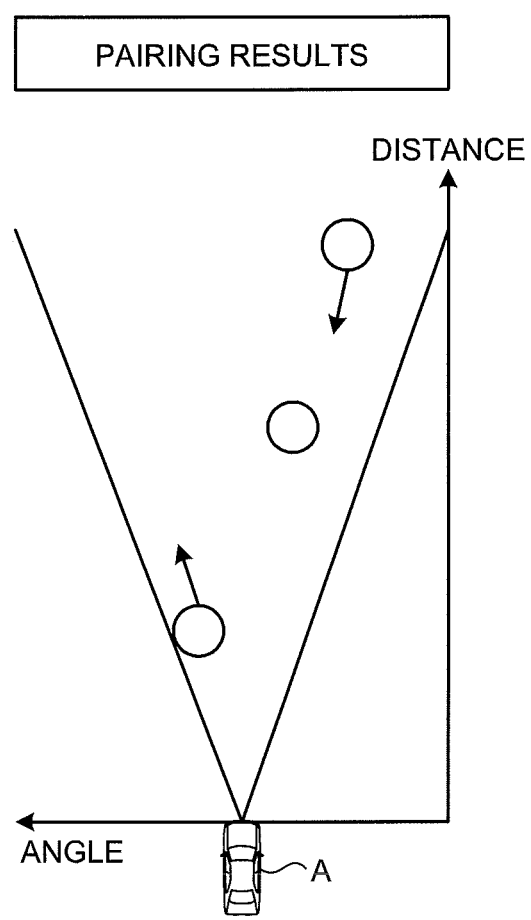
FIG. 6B is a diagram explaining a pairing result.

The pairing unit 72 performs a pairing that associates the peak Pu of the up zone with the peak Pd of the down zone on the basis of a matching degree between the peak angles and the angle powers in the up zone and those in the down zone, which are computed by the angle estimating unit 71, etc. FIG. 6A is a diagram explaining pairing based on azimuth angles and angle powers in up and down zones. FIG. 6B is a diagram explaining a pairing result. In FIGS. 6A and 6B, a horizontal axis indicates "angle (azimuth)", and a vertical axis indicates "distance (longitudinal distance)".

As illustrated in FIG. 6A, the pairing unit 72 performs a pairing on peaks whose peak angles and angle powers are within a predetermined range and close to each other among azimuth calculation results of peaks of each of UP and DN. In other words, the pairing unit 72 computes a Mahalanobis distance by using, for example, peak angles and angle powers of frequency peaks of respective UP and DN. A common technology may be used for computing the Mahalanobis distance. The pairing unit 72 associates, with each other, two peaks in respective UP and DN whose Mahalanobis distance is a minimum value.

Thus, the pairing unit 72 associates peaks on the same target T with each other. Therefore, the pairing unit 72 derives target data according to each of the plurality targets T existing ahead of the own vehicle A. This target data is obtained by associating two peaks with each other, and thus may be referred to as "pair data".

As illustrated in FIG. 6B, the pairing unit 72 computes a relative velocity and a distance of each of the targets T for the own vehicle A from the paired peaks of UP and DN ("○" illustrated in FIG. 6B). For example, the pairing unit 72 uses two peak data of an up zone and a down zone, on which target data (pair data) is based, so as to be able to derive parameters of this target data (longitudinal distance, lateral distance, and relative velocity). The radar device 1 performs the pairing so as to detect an existence of the target T.

The aforementioned processes to be executed by the peak extracting unit 70, the angle estimating unit 71, and the pairing unit 72 are processes that derive instantaneous values of the parameters (longitudinal distance, lateral distance, and relative velocity) of the target data, and are executed at each time when the reflected wave RW is received, which is caused by a beam irradiation (scan) that is alternately performed by the downward-transmission unit TX1 and the upward-transmission unit TX2.

The continuity determining unit 73 determines a temporal continuity between the target data derived in the past processing and that derived in the just-before processing. In other words, the continuity determining unit 73 determines whether or not the target data derived in the past processing and that derived in the just-before processing are on the same target. For example, the past processing is a previous target-data deriving process and the just-before processing is a present target-data deriving process. Specifically, the continuity determining unit 73 estimates a position of present target data on the basis of target data derived by the previous target-data deriving process, and determines the closest target data within a predetermined range from the estimated position derived by the present target-data deriving process as target data having a continuity with the target data derived by the past processing.

When target data having the continuity with the target data derived by the past processing is not derived in the just-before processing, in other words, when the continuity of the target data derived by the past processing is determined to be absent, the continuity determining unit 73 executes "extrapolation process", which virtually derives target data not derived by the just-before processing, on the basis of the parameters (longitudinal distance, lateral distance, and relative velocity) of the target data derived by the past processing.

Extrapolation data derived by the extrapolation process is used as the target data derived by the just-before processing. When the extrapolation process is executed on certain target data for a plurality of continuous times or with comparatively high frequency, the target is determined to be lost, and the target data is deleted from a predetermined storage region of the storage 63. Specifically, information on parameters of a target number indicating this target is deleted, and a value (value indicating deletion flag "OFF") that indicates the deletion of the parameters is set for this target number. The target number is an indicator that identifies each of the target data, and different numbers are provided to the respective target data.

The filtering unit 74 smooths, in a time-axis direction, parameters (longitudinal distance, lateral distance, and relative velocity) of the two target data derived by processes of the past processing and the just-before processing so as to derive target data. Such filter-processed target data may be referred to as "internal-filter data" in contrast to the pair data indicating instantaneous values.

The target classifying unit 75 classifies each of the targets into a preceding vehicle, a stationary object (including stationary vehicle), and an on-coming vehicle on the basis of the relative velocity. For example, the target classifying unit 75 classifies a target having a larger relative velocity than a value of a velocity of the own vehicle A, which is in the same direction as that of the velocity of the own vehicle A, as "preceding vehicle". For example, the target classifying unit 75 classifies a target having a relative velocity in an approximately reverse direction of a velocity of the own vehicle A as "stationary object". For example, the target classifying unit 75 classifies a target having a larger relative velocity than a velocity of the own vehicle A, which is in a reverse direction of that of the velocity of the own vehicle A, as "on-coming vehicle". "Preceding vehicle" may be a target having a smaller relative velocity than a velocity of the own vehicle A, which is in the same direction as that of the velocity of the own vehicle A. "On-coming vehicle" may be a target having a smaller relative velocity than a velocity of the own vehicle A, which is in a reverse direction of that of the velocity of the own vehicle A.

The unnecessary target removing unit 76 determines, as an unnecessary target, an upper object, a lower object, raindrops, reception-wave ghosts, and the like among from targets, and removes the unnecessary target from an output target. A process for discriminating the upper object among from unnecessary targets will be mentioned later.

The grouping unit 77 performs grouping that integrates a plurality of target data into one as target data on the same object. For example, the grouping unit 77 integrates target data including detected positions and detected velocities close to each other within a predetermined range into one as target data on the same object so as to obtain one output, and reduces the number of outputs of target data.

The target-information outputting unit 78 selects, as an output object, a predetermined number (for example, 10) of target data among from a plurality of target data derived or derived by the extrapolation, and outputs the selected target data to the vehicle controlling device 2. The target-information outputting unit 78 preferentially selects target data existing in an own lane and according to a target closer to the own vehicle A on the basis of a longitudinal distance and a lateral distance of the target data. Herein, "own lane" is a traveling lane obtained by assuming that, when the own vehicle A is traveling at a substantial center of a traffic lane, widths from the center to both ends of the traffic lane are approximately 1.8 meters. The widths that define "own lane" may be appropriately changed in accordance with design.

The target data derived by the aforementioned target-data deriving process is stored in a predetermined storage region of the storage 63 as the parameters corresponding to the target number indicating each of the target data, and is used as target data derived by the past processing in the next and succeeding target-data deriving processes.

In other words, target data derived by the past target-data deriving process is saved as "history". For example, the peak extracting unit 70 estimates, with reference to "peak frequency" to be saved in a predetermined storage region of the storage 63 as "history", "peak frequency" having a temporal continuity with "history", and extracts a frequency within, for example, ±3 bin from the estimated "peak frequency". Thus, the radar device 1 can rapidly select "peak frequency" corresponding to a target having necessity for being preferentially output to the vehicle controlling device 2. "Peak frequency" of the estimated present target data may be referred to as "estimated bin".

Process for Discriminating Between Stationary Vehicle and Upper Object According to First Embodiment Hereinafter, details of a process for discriminating between a stationary vehicle and an upper object to be executed by the unnecessary target removing unit 76 according to the first embodiment will be explained with reference to FIGS. 7A to 18 in the order of STEPS 1 to 3.

STEP1: Computation of Probability Ratio

The unnecessary target removing unit 76 computes, on the basis of the following formula (1), six probability ratios (logarithmic likelihoods) on a target by using parameters based on target data acquired for each scan and the corresponding probability-distribution model. The probability-distribution model used for computing each of the six probability ratios is preliminary defined or constructed on the basis of actual measured values at intervals of, for example, 10 m, and intervals of less than 10 meters are linearly interpolated.

Figure 8:
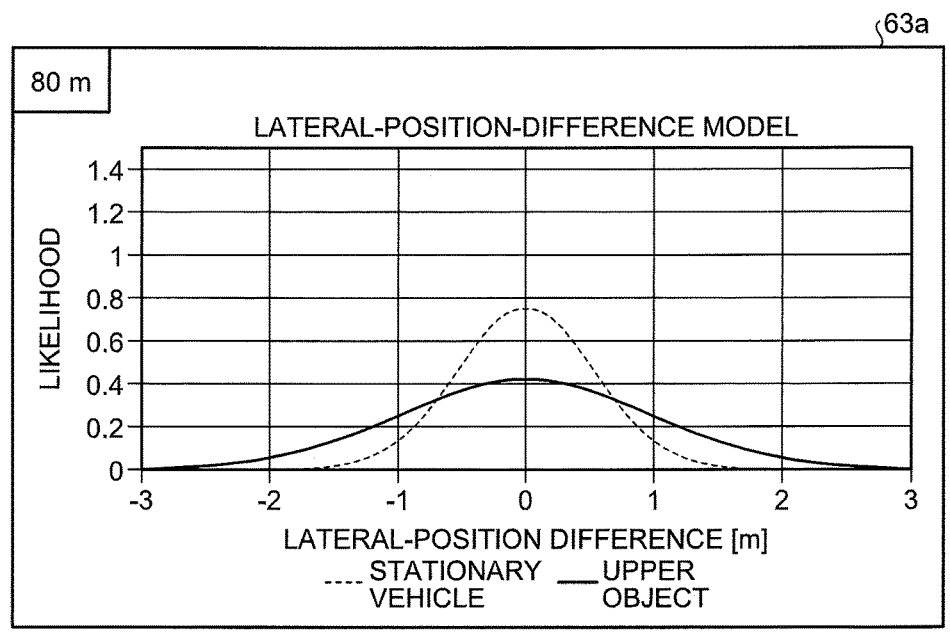
FIG. 8 is a diagram illustrating a lateral-position-difference model according to the first embodiment.

As described above with reference to FIG. 2, the probability-distribution models used for computing probability ratios include the lateral-position-difference model 63a, the relative-velocity-difference model 63b, the independent beam-slope-difference model 63c, the upward-downward beam power difference slope model 63d, the upward-downward beam area differential model 63e, and the extrapolation-factor type likelihood table 63f Details of the lateral-position-difference model 63a will be mentioned later with reference to FIG. 8. Details of the relative-velocity-difference model 63b will be mentioned later with reference to FIG. 10. Details of the independent beam-slope-difference model 63c will be mentioned later with reference to FIG. 12. Details of the upward-downward beam power difference slope model 63d will be mentioned later with reference to FIG. 14. Details of the upward-downward beam area differential model 63e will be mentioned later with reference to FIG. 17. Details of the extrapolation-factor type likelihood table 63f will be mentioned later with reference to FIG. 18.

$$\text{Probability ratio } n = \log(\text{Stationary-vehicle Likelihood } n/\text{Upper-Object Likelihood } n) = \log(\text{Stationary-vehicle Likelihood } n) - \log(\text{UPpper-Object Likelihood } n) \quad (1)$$

(n=1, 2, 3, . . . , 6)

In the aforementioned formula (1), "probability ratio 1" in a case of "n=1" is a logarithmic likelihood between a stationary vehicle and an upper object based on a parameter "lateral-position difference" to be mentioned later. In the aforementioned formula (1), "probability ratio 2" in a case of "n=2" is a logarithmic likelihood between a stationary vehicle and an upper object based on a parameter "relative velocity difference" to be mentioned later. In the aforementioned formula (1), "probability ratio 3" in a case of "n=3" is a logarithmic likelihood between a stationary vehicle and an upper object based on a parameter "independent beam-slope difference" to be mentioned later. In the aforementioned formula (1), "probability ratio 4" in a case of "n=4" is a logarithmic likelihood between a stationary vehicle and an upper object based on a parameter "upward-downward beam power difference slope" to be mentioned later. In the aforementioned formula (1), "probability ratio 5" in a case of "n=5" is a logarithmic likelihood between a stationary vehicle and an upper object based on a parameter "upward-downward beam area differential" to be mentioned later. In the aforementioned formula (1), "probability ratio 6" in a case of "n=6" is a logarithmic likelihood between a stationary vehicle and an upper object based on a parameter "extrapolation-factor type" to be mentioned later.

STEP1-1: Logarithmic Likelihood Computation Based on "Lateral Position Difference"

The unnecessary target removing unit 76 computes, on the basis of the following formula (2), a lateral-position difference from a difference between a present lateral position acquired by a present scan and a previous lateral position acquired by a previous scan.

Lateral-Position Difference=Present Lateral Position− Previous Lateral Position   (2)

Figure 7A:
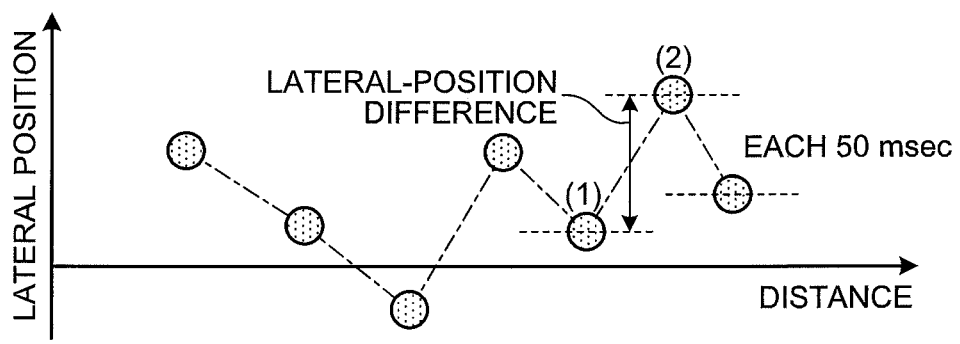
FIG. 7A is a diagram explaining a method for computing a lateral-position difference according to the first embodiment.

FIG. 7A is a diagram explaining a method for computing a lateral-position difference according to the first embodiment. In FIG. 7A, a horizontal axis indicates a distance (detection distance), and a vertical axis indicates a lateral position. As illustrated in FIG. 7A, a previous lateral position (corresponding to, for example, (2) illustrated in FIG. 7A) is subtracted from a present lateral position (corresponding to, for example, (1) illustrated in FIG. 7A) among lateral positions of targets acquired at intervals of, for example, 50 msec, and thus a lateral-position difference is computed.

Figure 7B:
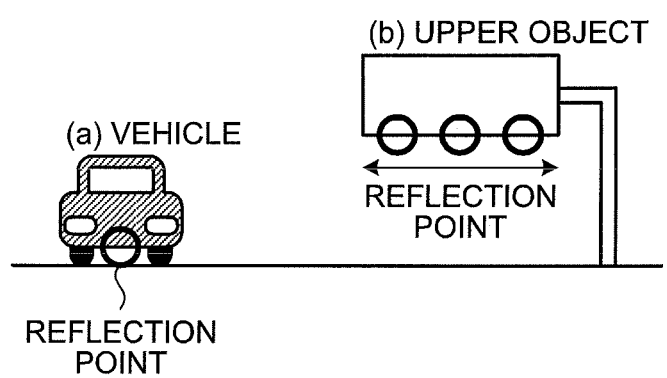
FIG. 7B is a diagram explaining a background of the computing of the lateral-position difference according to the first embodiment.

FIG. 7B is a diagram explaining a background of the computing of the lateral-position difference according to the first embodiment. As illustrated in FIG. 7B, the reason for computing a lateral-position difference is based on the fact that, whereas (a) a reflection-point position of a vehicle is stable, (b) a reflection-point position of an upper object is unstable because of its lateral width and the lateral position can move, and thus the lateral-position difference tends to be large.

The unnecessary target removing unit 76 computes, on the basis of the aforementioned formula (1), "probability ratio 1" from a lateral-position difference that is computed on the basis of the lateral-position-difference model 63a illustrated in FIG. 8 as an example and the aforementioned formula (2). FIG. 8 is a diagram illustrating a lateral-position-difference model according to the first embodiment. The lateral-position-difference model 63a is a probability-distribution model in which a horizontal axis indicates a lateral-position difference [m] and a vertical axis indicates the likelihood, and a relation between the lateral-position difference and the likelihood is indicated for each of a stationary vehicle and an upper object. The probability-distribution model of each of the stationary vehicle and the upper object illustrated in FIG. 8 is a model based on, for example, a normal distribution, which is preliminary constructed by a maximum-likelihood estimating method and an experimental design method. In the lateral-position-difference model 63a, parameters, which characterize the model, are adjusted for each of the stationary vehicle and the upper object so as to improve determination precision.

In FIG. 8, as the lateral-position-difference model 63a, a lateral-position-difference model in a case where a distance from the own vehicle A to a target is 80 meters is illustrated as an example, and the illustration of lateral-position-difference models in cases where respective distances from the own vehicle A to the target are approximately from 10 meters to 80 to 150 meters (10 m unit) is omitted.

For example, a case is assumed, in which "lateral-position difference" computed on the basis of the aforementioned formula (2) is "1". In this case, with reference to FIG. 8, when the lateral-position difference of the horizontal axis is "1", on the vertical axis, a likelihood of a stationary vehicle is approximately "0.13", and a likelihood of an upper object is approximately "0.27". Therefore, when "n=1" in the aforementioned formula (1), a probability ratio 1 can be computed by "probability ratio 1=log (stationary-vehicle likelihood 1)−log (upper-object likelihood 1)=log (0.13)−log (0.27)".

STEP1-2: Logarithmic Likelihood Computation Based on "Relative-Velocity Difference"

The unnecessary target removing unit 76 computes, on the basis of the following formula (3), a relative-velocity difference from a present relative velocity and a differentiated distance difference between a present distance acquired by a present scan and a previous distance acquired by a previous scan.

$$\text{Relative-Velocity Difference} = -1 \times \frac{\text{Present Distance} - \text{Previous Distance}}{\text{Update Period}} + \text{Present } Relative \ Veloc \quad (3)$$

Figure 9A:
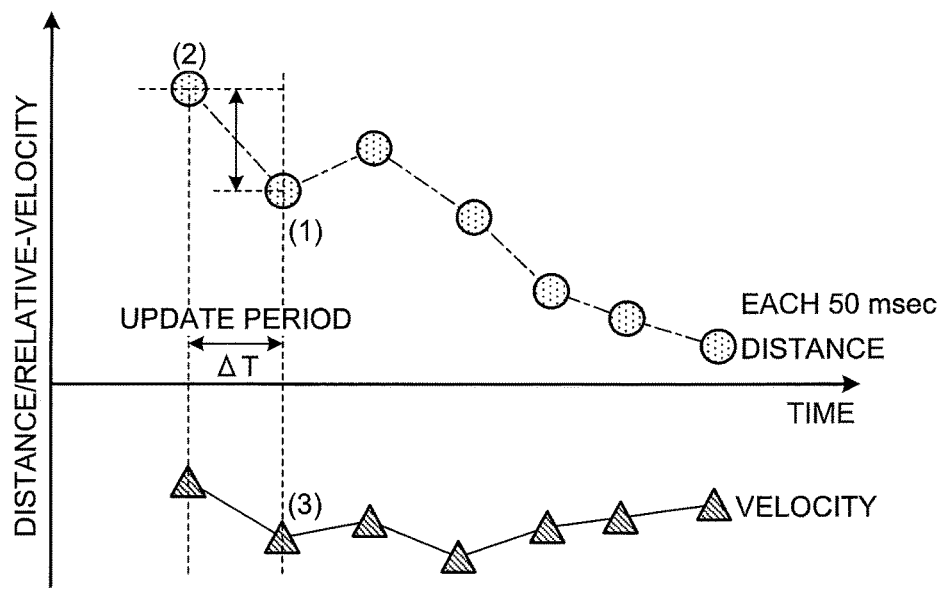
FIG. 9A is a diagram explaining a method for computing a relative-velocity difference according to the first embodiment.

FIG. 9A is a diagram explaining a method for computing a relative-velocity difference according to the first embodiment. As illustrated in FIG. 9A, among distances of targets acquired at intervals of, for example, 50 msec, a previous distance (for example, corresponding to (2) illustrated in FIG. 9A) is subtracted from a present distance (for example, corresponding to (1) illustrated in FIG. 9A) to compute "present distance−previous distance", and this "present distance−previous distance" is divided by an update period (for example, corresponding to "ΔT=50 msec" illustrated in FIG. 9A) to compute a differentiated distance difference between the present distance and the previous distance. A present relative velocity (for example, corresponding to (3) illustrated in FIG. 9A) is added to the differentiated distance difference between the present distance and the previous distance whose sign is inverted to compute a relative-velocity difference.

Figure 9B:
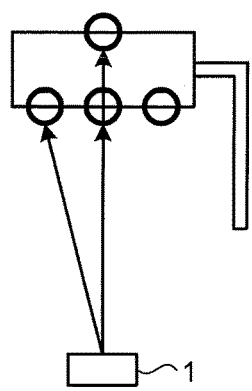
FIG. 9B is a diagram explaining a background of the computing of the relative-velocity difference according to the first embodiment.

FIG. 9B is a diagram explaining a background of the computing of the relative-velocity difference according to the first embodiment. As illustrated in FIG. 9B, the reason for computing a relative-velocity difference is based on the fact that, because an upper object has vertical and lateral widths, a reflection-point position becomes unstable, and a vertical and lateral position thereof can move, and thus a distance to the radar device 1 tends to change largely to enlarge a time differential of a detection distance.

Figure 10:
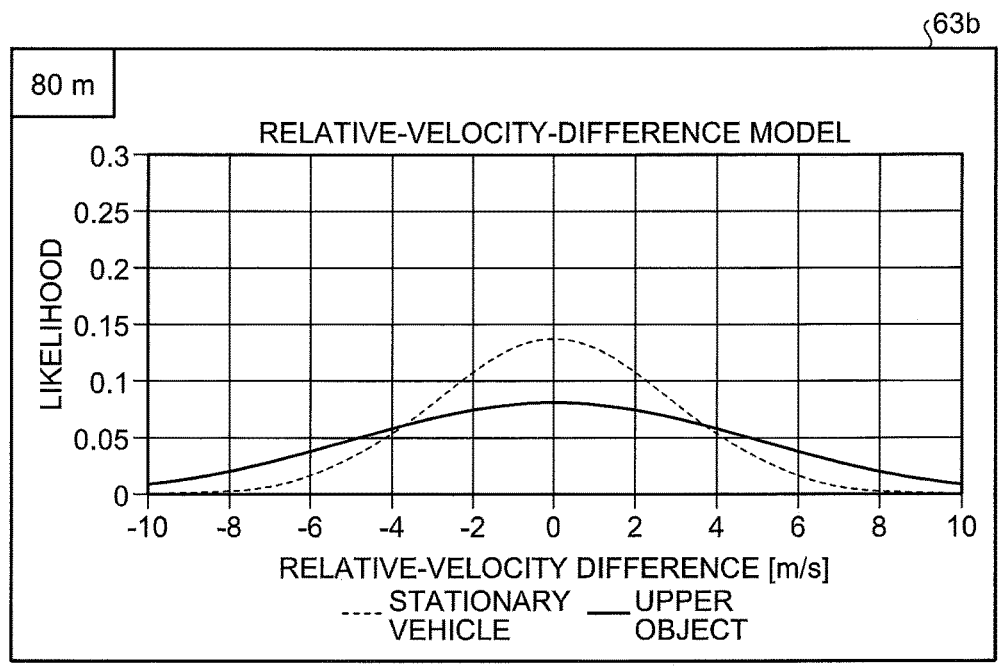
FIG. 10 is a diagram illustrating a relative-velocity-difference model according to the first embodiment.

The unnecessary target removing unit 76 computes, on the basis of the aforementioned formula (1), "probability ratio 2" from a relative-velocity difference computed on the basis of the relative-velocity-difference model 63b illustrated in FIG. 10 as an example and the aforementioned formula (3). FIG. 10 is a diagram illustrating a relative-velocity-difference model according to the first embodiment. The relative-velocity-difference model 63b is a probability-distribution model in which a horizontal axis indicates a relative-velocity difference [m/s] and a vertical axis indicates the likelihood, and a relation between the relative-velocity difference and the likelihood is indicated for each of a stationary vehicle and an upper object. The probability-distribution model of each of the stationary vehicle and the upper object illustrated in FIG. 10 is a model based on, for example, a normal distribution, which is preliminary constructed by a maximum-likelihood estimating method and an experimental design method. In the relative-velocity-difference model 63*b*, parameters, which characterize the model, are adjusted for each of the stationary vehicle and the upper object so as to improve determination precision.

In FIG. 10, as the relative-velocity-difference model 63*b*, a relative-velocity-difference model in a case where a distance from the own vehicle A to a target is 80 m is illustrated as an example, and the illustration of relative-velocity-difference models where respective distances from the own vehicle A to the target are approximately from 10 m to 80 to 150 m (10 m unit) is omitted.

For example, a case is assumed, in which "lateral-position difference" computed on the basis of the aforementioned formula (3) is "2". In this case, with reference to FIG. 10, when the relative-velocity difference of the horizontal axis is "2", on the vertical axis, a likelihood of a stationary vehicle is approximately "0.11", and a likelihood of an upper object is approximately "0.75". Therefore, when "n=2" in the aforementioned formula (1), the probability ratio 2 can be computed by "probability ratio 2=log (stationary-vehicle likelihood 2)–log (upper-object likelihood 2)=log (0.11)–log (0.75)".

STEP1-3: Logarithmic Likelihood Computation Based on "Independent Beam-Slope Difference"

The unnecessary target removing unit 76 computes, on the basis of the following formula (4), an independent beam-slope difference from a present distance and an angle power acquired by a present scan and a previous distance and a previous angle power acquired by a previous scan. The reason for computing an independent beam-slope difference is based on the fact that, because the independent beam-slope difference is associated with a multipath power fluctuation, a stationary vehicle and an upper object can be discriminated by using the independent beam-slope difference.

$$\text{Independent Beam-Slope Difference=Present Upward-Beam(Downward-Beam)Slope–Previous Upward-Beam(Downward-Beam)Slope} \quad (4)$$

Figure 11:
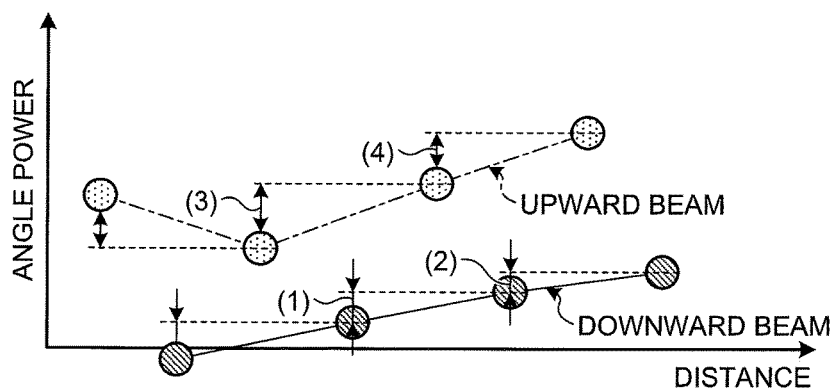
FIG. 11 is a diagram explaining computing of an upward-beam slope and a downward-beam slope, which are parameters for computing an independent beam-slope difference according to the first embodiment.

FIG. 11 is a diagram explaining computing of an upward-beam slope and a downward-beam slope, which are parameters for computing an independent beam-slope difference according to the first embodiment. As illustrated in FIG. 11, among angle powers of targets of each of the upward and downward beams acquired at intervals of, for example, 50 msec, with respect to the downward beam, a previous angle-power difference (for example, corresponding to (2) illustrated in FIG. 11) is subtracted from a present angle-power difference (for example, corresponding to (1) illustrated in FIG. 11) and the subtraction result is divided by "previous distance–present distance" to compute a downward-beam slope. With respect to the upward beam, a previous angle–power difference (for example, corresponding to (4) illustrated in FIG. 11) is subtracted from a present angle-power difference (for example, corresponding to (3) illustrated in FIG. 11) and the subtraction result is divided by "previous distance–present distance" to compute the upward-beam slope difference. The previous upward-beam slope is subtracted from the present upward-beam slope to compute an independent beam-slope difference of the upward beam. The previous downward-beam slope is subtracted from the present downward-beam slope to compute an independent beam-slope difference of the downward beam.

Figure 12:
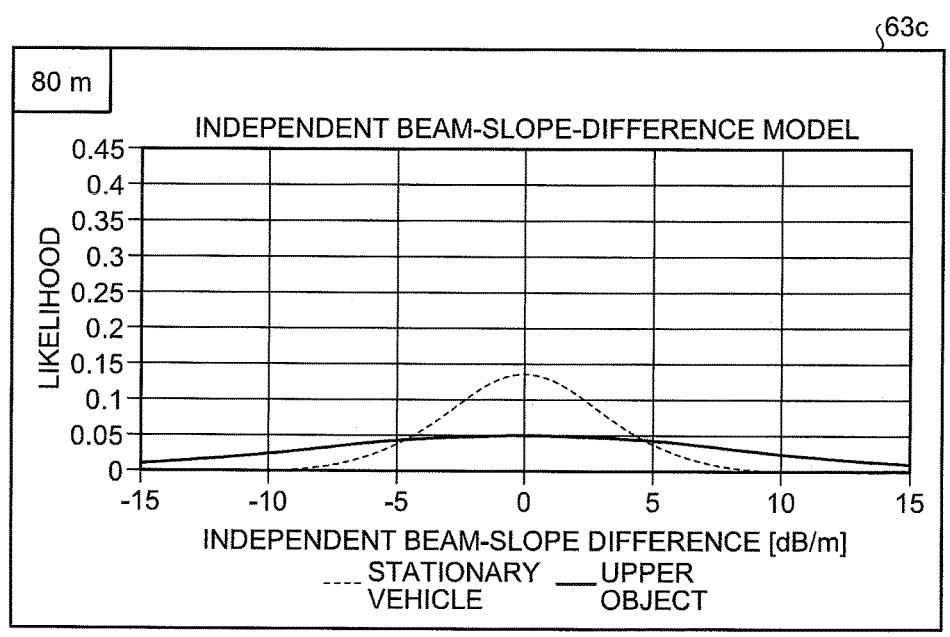
FIG. 12 is a diagram illustrating an independent beam-slope-difference model according to the first embodiment.

The unnecessary target removing unit 76 computes, on the basis of the aforementioned formula (1), "probability ratio 3" from an independent beam-slope difference computed on the basis of the independent beam-slope-difference model 63*c* illustrated in FIG. 12 as an example and the aforementioned formula (4). FIG. 12 is a diagram illustrating an independent beam-slope-difference model according to the first embodiment. The independent beam-slope-difference model 63*c* is a probability-distribution model in which a horizontal axis indicates an independent beam-slope difference [dB/m] and a vertical axis indicates the likelihood, and a relation between the independent beam-slope difference and the likelihood is indicated for each of a stationary vehicle and an upper object. The probability-distribution model of each of the stationary vehicle and the upper object illustrated in FIG. 12 is a model based on, for example, a normal distribution, which is preliminary constructed by a maximum-likelihood estimating method and an experimental design method. In the independent beam-slope-difference model 63*c*, parameters, which characterize the model, are adjusted for each of the stationary vehicle and the upper object so as to improve determination precision.

In FIG. 12, as the independent beam-slope-difference model 63*c*, an independent beam-slope-difference model in a case where a distance from the own vehicle A to a target is 80 m is illustrated as an example, and the illustration of independent beam-slope-difference models where respective distances from the own vehicle A to the target are approximately from 10 m to 80 to 150 m (10 m unit) is omitted.

For example, a case is assumed, in which "independent beam-slope difference" computed on the basis of the aforementioned formula (4) is "0". In this case, with reference to FIG. 12, when the independent beam-slope difference of the horizontal axis is "0", on the vertical axis, a likelihood of a stationary vehicle is approximately "0.14", and a likelihood of an upper object is approximately "0.05". Therefore, when "n=3" in the aforementioned formula (1), the probability ratio 3 can be computed by "probability ratio 3=log (stationary-vehicle likelihood 3)–log (upper-object likelihood 3)=log (0.14)–log (0.05)".

STEP1-4: Logarithmic Likelihood Computation Based on "Upward-Downward Beam Power Difference Slope"

The unnecessary target removing unit 76 computes, on the basis of the following formula (5), a slope of power difference between upward and downward beams. The reason for computing an upward-downward beam power difference slope is based on the fact that, because the upward-downward beam power difference slope is associated with a multipath power fluctuation, a stationary vehicle and an upper object can be discriminated by using the upward-downward beam power difference slope.

$$\text{Upward-Downward Beam Power Difference Slope} = \frac{\text{Present Angle-Power Difference} - \text{Previous Angle-Power Difference}}{d1 - d2} \quad (5)$$

$$\text{Present Angle-Power Difference} = \text{Interpolation Value Of Upward-Beam Angle Power} - \text{Downward-Beam Present Angle Power} \quad (3')$$
$$\quad (3)$$

$$\text{Previous Angle-Power Difference} = \text{Upward-Beam Previous Angle Power} - \text{Interpolation Value Of Downward-Beam Angle Power} \quad (2)$$
$$\quad (2')$$

Figure 13:
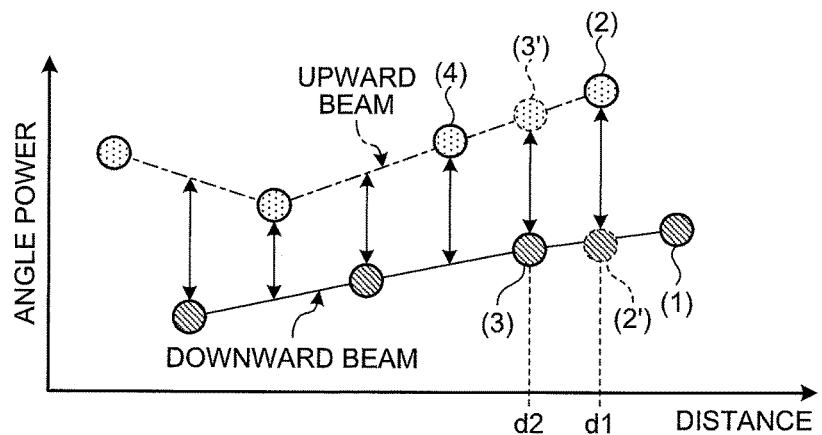
FIG. 13 is a diagram explaining a method for computing an upward-downward beam power difference slope according to the first embodiment.

FIG. 13 is a diagram explaining a method for computing an upward-downward beam power difference slope according to the first embodiment. As illustrated in FIG. 13, among angle powers of targets of each of the upward and downward beams acquired at intervals of, for example, 50 msec, a downward-beam previous angle power (for example, corresponding to (1) illustrated in FIG. 13) and a downward-beam present angle power (for example, corresponding to (3) illustrated in FIG. 13) are linearly interpolated to compute an interpolation value (for example, corresponding to (2') illustrated in FIG. 13) of a downward beam angle power at a distance d1 corresponding to an upward-beam previous angle power (for example, corresponding to (2) illustrated in FIG. 13). The upward-beam previous angle power (for example, corresponding to (2) illustrated in FIG. 13) and an upward-beam present angle power (for example, corresponding to (4) illustrated in FIG. 13) are linearly interpolated to compute an interpolation value (for example, corresponding to (3') illustrated in FIG. 13) of an upward-beam angle power at a distance d2 corresponding to a downward-beam present angle power (for example, corresponding to (3) illustrated in FIG. 13).

A reason for using the interpolation value as described above is, because upward and downward beams are alternately transmitted with a period of 50 msec and there exists a time lag between timings of angle powers between these beams, for according the timings with each other so as to compute more precise angle power difference.

The unnecessary target removing unit 76 computes, as "present angle-power difference", "interpolation value of upward-beam angle power (for example, corresponding to (3') illustrated in FIG. 13)–downward-beam present angle power (for example, corresponding to (3) illustrated in FIG. 13)". The unnecessary target removing unit 76 computes, as "previous angle-power difference", "upward-beam previous angle power (for example, corresponding to (2) illustrated in FIG. 13)–interpolation value of downward beam angle power (for example, corresponding to (2') illustrated in FIG. 13)". The unnecessary target removing unit 76 computes an upward-downward beam power difference slope on the basis of the aforementioned formula (5). Herein, "d1" and "d2" in the aforementioned formula (5) accord with respective "d1" and "d2" illustrated in FIG. 13.

Figure 14:
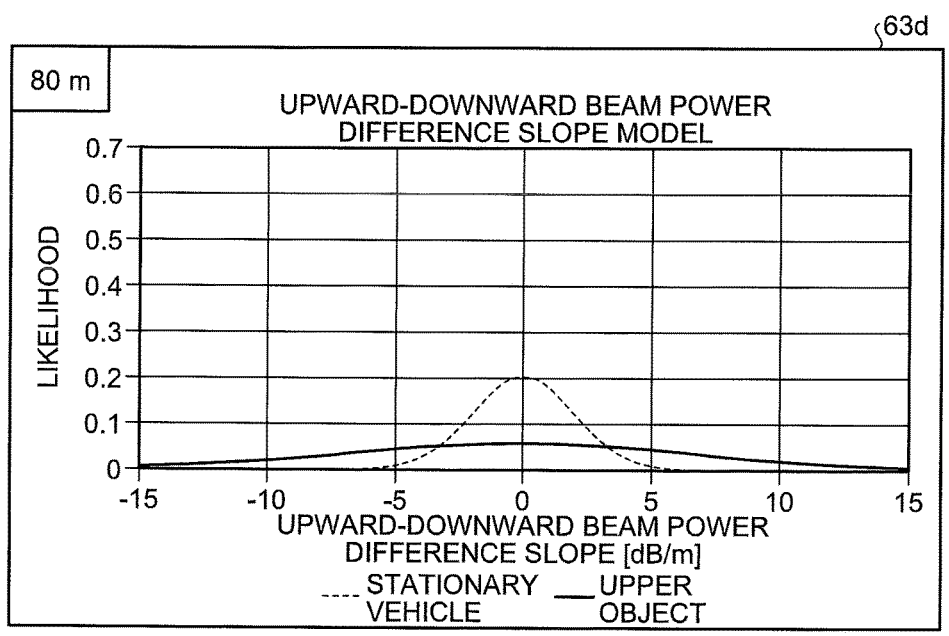
FIG. 14 is a diagram illustrating an upward-downward beam power difference slope model according to the first embodiment.

The unnecessary target removing unit 76 computes, on the basis of the aforementioned formula (1), "probability ratio 4" from an upward-downward beam power difference slope computed on the basis of the upward-downward beam power difference slope model 63d illustrated in FIG. 14 as an example and the aforementioned formula (5). FIG. 14 is a diagram illustrating an upward-downward beam power difference slope model according to the first embodiment. The upward-downward beam power difference slope model 63d is a probability-distribution model in which a horizontal axis indicates an upward-downward beam difference slope [dB/m] and a vertical axis indicates the likelihood, and a relation between the upward-downward beam difference slope and the likelihood is indicated for each of a stationary vehicle and an upper object. The probability-distribution model of each of the stationary vehicle and the upper object illustrated in FIG. 14 is a model based on, for example, a normal distribution, which is preliminary constructed by a maximum-likelihood estimating method and an experimental design method. In the upward-downward beam power difference slope model 63d, parameters, which characterize the model, are adjusted for each of the stationary vehicle and the upper object so as to improve determination precision.

In FIG. 14, as the upward-downward beam power difference slope model 63d, an upward-downward beam power difference slope model in a case where a distance from the own vehicle A to a target is 80 m is illustrated as an example, and the illustration of upward-downward beam power difference slope models where respective distances from the own vehicle A to the target are approximately from 10 m to 80 to 150 m (10 m unit) is omitted.

For example, a case is assumed, in which "upward-downward beam difference slope" computed on the basis of the aforementioned formula (5) is "0". In this case, with reference to FIG. 14, when the upward-downward beam difference slope of the horizontal axis is "0", on the vertical axis, a likelihood of a stationary vehicle is approximately "0.2", and a likelihood of an upper object is approximately "0.06". Therefore, when "n=4" in the aforementioned formula (1), the probability ratio 4 can be computed by "probability ratio 4=log (stationary-vehicle likelihood 4)–log (upper-object likelihood 4)=log (0.2)–log (0.06)".

STEP1-5: Logarithmic Likelihood Computation Based on "Upward-Downward Beam Area Differential"

A multipath of a reflected wave affects an angle power, and the effect changes in accordance with a height of a target. In a case of a point a long distance away from the own vehicle A, the effect of the multipath appears stronger on an upper object than on a stationary vehicle. A distance (frequency per distance), at which a convex Null point by a multipath appears, hardly receives an effect caused by a perpendicular attachment angle of a radar device, in other words, this parameter obtained by normalizing a change amount of an upward-downward beam power difference by using a distance hardly receives an effect caused by a radar mounting condition. "Convex Null" is a curve line that is protruding upward at a neighborhood of a local maximum point and a curve line having, at a neighborhood of a local minimum point, a shape similar to that of, for example, a cycloid curve line at a neighborhood of a local minimum point.

Figure 15A:
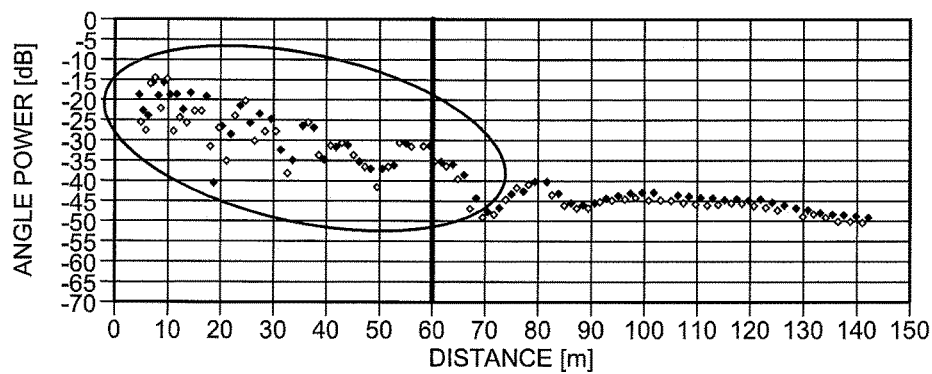
FIG. 15A is a diagram illustrating a relation between an angle power and a distance of a stationary vehicle.
Figure 15B:
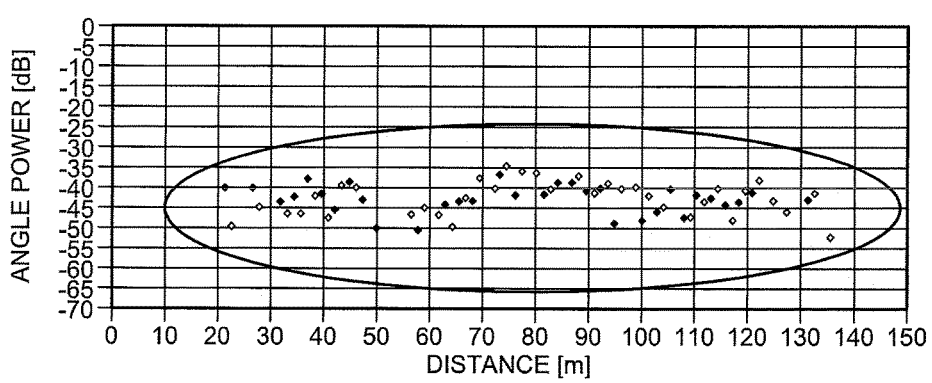
FIG. 15B is a diagram illustrating a relation between an angle power and a distance of an upper object.

FIG. 15A is a diagram illustrating a relation between an angle power and a distance of a stationary vehicle. FIG. 15B is a diagram illustrating a relation between an angle power and a distance of an upper object. From a frame-enclosed part illustrated in FIG. 15A, it is found that a stationary vehicle receives an effect of a multipath at a distance 70 to 80 m or less, and a distribution of the angle power varies and a change amount is large. On the other hand, from a frame-enclosed part illustrated in FIG. 15B, it is found that an upper object receives an effect of a multipath, and a distribution of an angle power varies and a change amount is large regardless of a distance.

Figure 16:
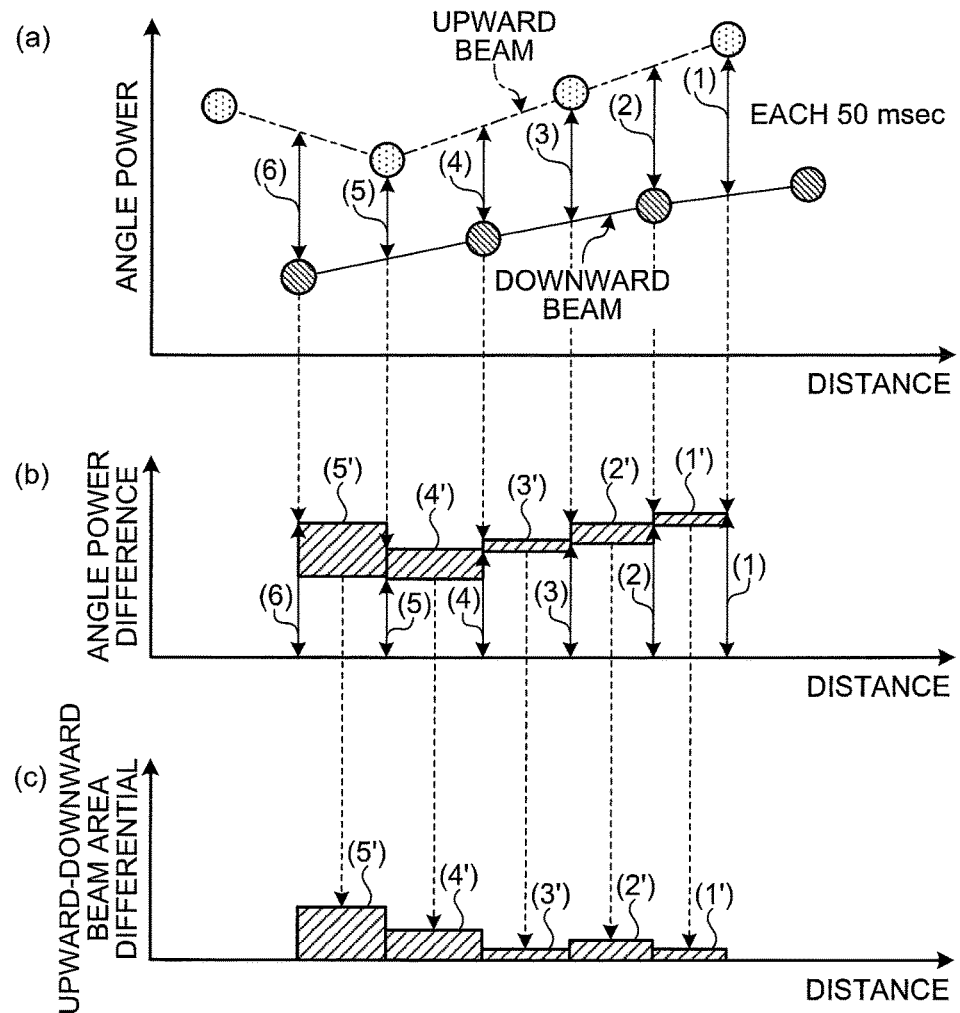
FIG. 16 is a diagram explaining a method for computing an upward-downward beam area differential according to the first embodiment.

The unnecessary target removing unit 76 computes an upward-downward beam area differential in a manner illustrated in FIG. 16. FIG. 16 is a diagram explaining a method for computing an upward-downward beam area differential according to the first embodiment. As illustrated in FIG. 16, angle powers of the same distance are computed by a linear interpolation performed on angle powers of targets of each of upward and downward beams acquired at intervals of, for example, 50 msec, to compute "angle power difference" between upward and downward beams at the same distance (corresponding to (1) to (6) illustrated in FIG. 16(a)).

A reason for computing, as described above, "angle power difference" between upward and downward beams by using angle powers of the same distance obtained by a linear interpolation is, because upward and downward beams are alternately transmitted with a period of 50 msec and there exists a time lag between timings of angle powers of the beams, for according the timings with each other so as to compute more precise angle power difference.

As illustrated in FIG. 16 (b), the unnecessary target removing unit 76 uses |angle power difference (1)–angle power difference (2)| as "upward-downward beam angle power difference" and uses {distance (1)–distance (2)} as "distance difference" so as to compute "(upward-downward beam angle power difference)×(distance difference)" and obtain an area (1'). Herein, |*| indicates an absolute value of "*".

Similarly, "area (2')=|angle power difference (2)–angle power difference (3)|×{distance (2)–distance (3)}", "area (3')=|angle power difference (3)–angle power difference (4)|×{distance (3)–distance (4)}", and "area (4')=|angle power difference (5)–angle power difference (6)|×{distance (5)–distance (6)}" are computed.

The areas of respective cycles computed in the aforementioned manner are illustrated in FIG. 16 (c). The unnecessary target removing unit 76 divides, on the basis of the following formula (6), a total value of the areas (upward-downward beam angle power differences) in the cycles of the same target, which are computed in the aforementioned manner, by a total of the distance differences so as to compute "upward-downward beam area differential".

$$\text{Upward-Downward Beam Area Differential} = \frac{\sum \text{Upward-Downward Beam Angle Power Difference}}{\sum \text{Distance Difference}} \quad (6)$$

Figure 17:
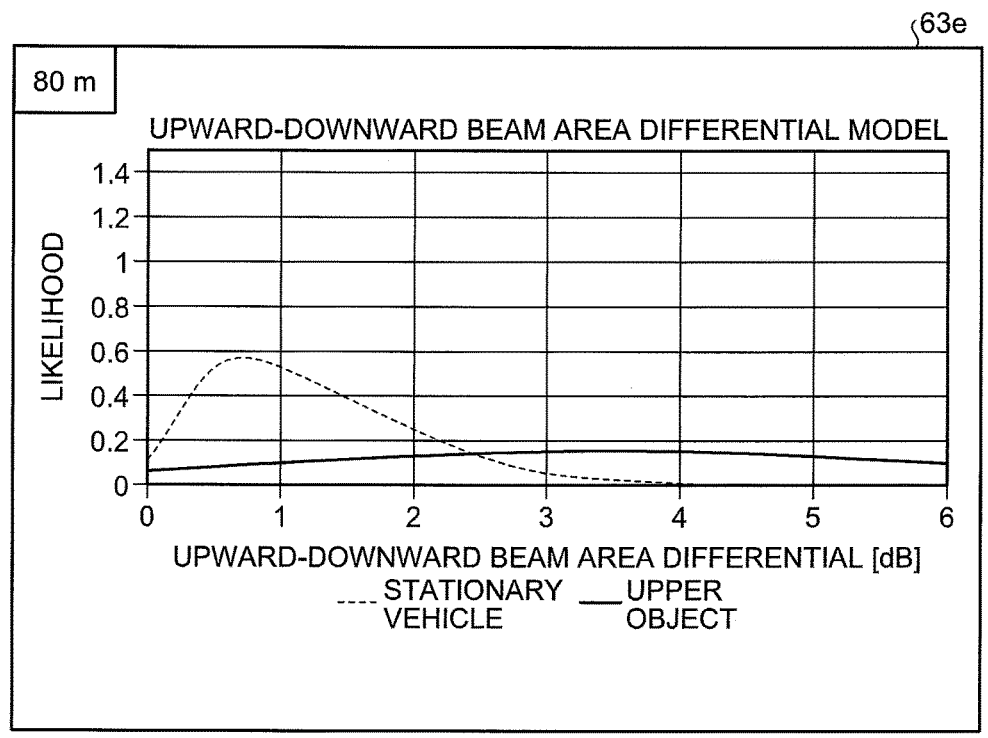
FIG. 17 is a diagram illustrating an upward-downward beam area differential model according to the first embodiment.

The unnecessary target removing unit 76 computes, on the basis of the aforementioned formula (1), "probability ratio 5" from the upward-downward beam area differential model 63e illustrated in FIG. 17 as an example and "upward-downward beam area differential" computed in the aforementioned manner. FIG. 17 is a diagram illustrating an upward-downward beam area differential model according to the first embodiment. The upward-downward beam area differential model 63e is a probability-distribution model in which a horizontal axis indicates an upward-downward beam area differential [dB] and a vertical axis indicates the likelihood, and a relation between the upward-downward beam area differential and the likelihood is indicated for each of a stationary vehicle and an upper object. The probability-distribution model of each of the stationary vehicle and the upper object illustrated in FIG. 17 is a model based on, for example, a skew-normal distribution, which is preliminary constructed by a maximum-likelihood estimating method and an experimental design method. In the upward-downward beam area differential model 63e, parameters, which characterize the model, are adjusted for each of the stationary vehicle and the upper object so as to improve determination precision.

In FIG. 17, as the upward-downward beam area differential model 63e, an upward-downward beam area differential model in a case where a distance from the own vehicle A to a target is 80 m is illustrated as an example, and the illustration of upward-downward beam power difference slope models where respective distances from the own vehicle A to the target are approximately from 10 m to 80 to 150 m (10 m unit) is omitted.

For example, a case is assumed, in which "upward-downward beam area differential" computed on the basis of the aforementioned formula (6) is "1". In this case, with reference to FIG. 17, when the upward-downward beam area differential is "1", on the vertical axis, a likelihood of a stationary vehicle is approximately "0.52", and a likelihood of an upper object is approximately "0.1". Therefore, when "n=5" in the aforementioned formula (1), the probability ratio 5 can be computed by "probability ratio 5=log (stationary-vehicle likelihood 5)–log (upper-object likelihood 5)=log (0.52)–log (0.1)".

STEP1-6: Logarithmic Likelihood Computation Based on "Extrapolation-Factor Type"

Reflection of an upper object is unstable because of effects of multipoint reflection, movement of a reflection point, power attenuation caused by a multipath, and the like, and thus an extrapolation is applied thereto in many cases. Features of the extrapolation are determined to compute a likelihood of each of the stationary vehicle and the upper object. In other words, likelihood logarithms of the same target are decided on the basis of presence/absence of an extrapolation in a present scan and a factor in a case where the extrapolation is present by using the extrapolation-factor type likelihood table 63f illustrated in FIG. 18. FIG. 18 is a diagram illustrating an extrapolation-factor type likelihood table according to the first embodiment. In FIG. 18, illustration of each of the specific numerical values is omitted by using " . . . ". For example, the continuity determining unit 73 executes an extrapolation process, and stores, in a predetermined storage region of the storage 63, presence/absence of an extrapolation and an extrapolation-factor type in a case where the extrapolation is present.

The extrapolation-factor types include seven kinds of, for example, "history absence", "peak absence", "angle absence", "continuity absence", "estimated-bin gap", "Mahalanobis distance NG", and "pair absence".

"History absence" indicates that "history" corresponding to "peak frequency" of a present extraction is not acquired or there exists no "history". "Peak absence" indicates that the peak extracting unit 70 can extract no peak from a frequency spectrum generated by the Fourier transforming unit 62. "Angle absence" indicates that, whereas the peak extracting unit 70 can extract a peak, the angle estimating unit 71 can estimate no angle of a target.

"Continuity absence" indicates that, whereas the pairing unit 72 can perform a pairing, no temporal continuity with target data derived in the just-before processing is determined to be absence by a continuity determination of the continuity determining unit 73.

"Estimated bin gap" indicates that an actual position of present target data does not exist within a predetermined range (for example, within ±3 bin) from an estimated position of the present target data, which is estimated by the continuity determining unit 73.

"Mahalanobis distance NG" indicates that the pairing unit 72 can perform no pairing because a minimum value of the Mahalanobis distance is a predetermined value or more. "Pair absence" indicates that the pairing unit 72 can perform no pairing because of another factor than "history absence", "peak absence", "angle absence", "continuity absence", "estimated bin gap", and "Mahalanobis distance NG".

In a case of extrapolation absence, in other words, a normal detection, in a present scan, the unnecessary target removing unit 76 reads, as a likelihood logarithm of each of the stationary vehicle and the upper object, a likelihood logarithm according to a detection distance in a corresponding column of "normal detection likelihood logarithm" in the extrapolation-factor type likelihood table 63f illustrated in FIG. 18. For example, when a detection distance R is 100 m, with reference to a row of "95<R≤105", a likelihood logarithm of a stationary vehicle is "−0.04", and a likelihood logarithm of an upper object is "−0.16". Therefore, when "n=6" in the aforementioned formula (1), the probability ratio 6 can be computed by "probability ratio 6=log (stationary-vehicle likelihood 6)−log (upper-object likelihood 6)=(−0.04)−(−0.16)".

In a case of extrapolation presence and "history absence" of an extrapolation-factor type at a present scan, the unnecessary target removing unit 76 reads, as a likelihood logarithm of each of the stationary vehicle and the upper object, a likelihood logarithm according to a detection distance in a corresponding column of "history absence likelihood logarithm" in the extrapolation-factor type likelihood table 63*f* illustrated in FIG. 18. For example, when the detection distance R is 100 m, with reference to a row of "95<R≤105", a likelihood logarithm of a stationary vehicle is "−2.48", and a likelihood logarithm of an upper object is "−1.13". Therefore, when "n=6" in the aforementioned formula (1), the probability ratio 6 can be computed by "probability ratio 6=log (stationary-vehicle likelihood 6)−log (upper-object likelihood 6)=(−2.48)−(−1.13). Other extrapolation-factor types are similar thereto.

STEP2: Computation of Probability Ratio OverAll

The unnecessary target removing unit 76 computes, on the basis of the following formula (7), a probability ratio Over-All obtained by totalizing the probability ratios 1 to 6 computed in the aforementioned STEPs 1-1 to 1-6.

Probability Ratio Over All=Probability Ratio
1+Probability Ratio 2+Probability Ratio
3+Probability Ratio 4+Probability Ratio
5+Probability Ratio 6    (7)

STEP3: Discrimination Process Between Stationary Vehicle and Upper Object

The unnecessary target removing unit 76 performs a threshold determination on the probability ratio OverAll computed in the aforementioned STEP2 so as to determine whether a target object is a stationary vehicle or an upper object. In other words, the unnecessary target removing unit 76 determines that the target is the stationary vehicle when the probability ratio OverAll is equal to or more than a predetermined threshold, and determines that the target is the upper object when the probability ratio OverAll is less than the predetermined threshold.

Target-Information Outputting Process According to First Embodiment

Figure 19A:
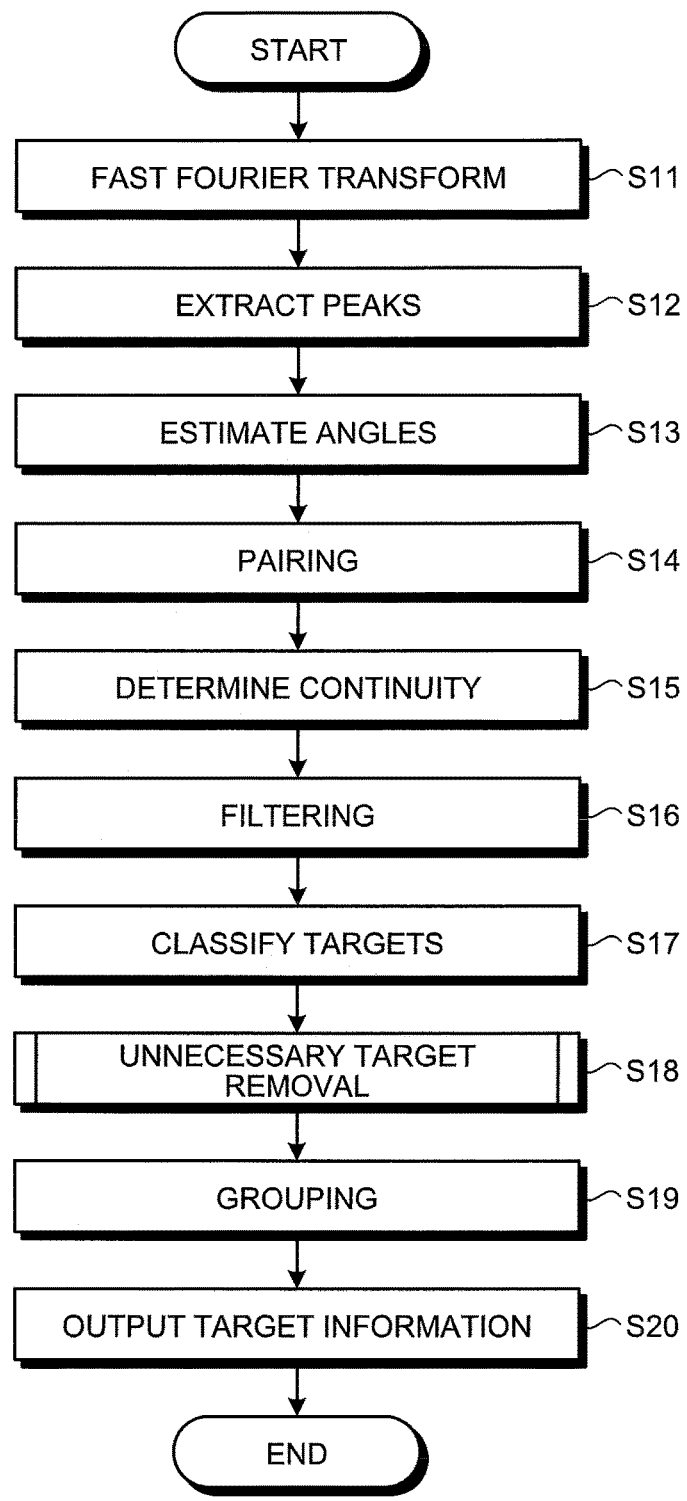
FIG. 19A is a flowchart illustrating a target-information outputting process according to the first embodiment.

FIG. 19A is a flowchart illustrating a target-information outputting process according to the first embodiment. The signal processing unit 6 repeatedly executes a target-information deriving process with a predetermined time (for example, 5 msec) period. At a starting-time point of the target-information deriving process, a beat signal that is converted from the reflected wave RW is input to the signal processing unit 6 from each of the four receiving units RX.

First, the Fourier transforming unit 62 of the signal processing unit 6 performs a Fast Fourier Transformation on the beat signal output from each of the plurality of individual receiving units 52 (Step S11). Next, the peak extracting unit 70 extracts a peak exceeding a predetermined signal level from an frequency spectrum generated by the Fourier transforming unit 62 in each of the zones of an up zone in which a frequency of a transmission signal rises and a down zone in which the frequency drops (Step S12).

Next, the angle estimating unit 71 executes an azimuth computing process with respect to each of the up zone and the down zone so as to disconnect information on a plurality of targets existing at the same bin from a signal of one peak frequency, and estimates angles of the respective targets (Step S13).

Next, the pairing unit 72 associates peaks on the same target T with each other, and derives pairing data according to each of the plurality of targets T existing at the forward of the own vehicle A (pairing, Step S14). Next, the continuity determining unit 73 determines a continuity of whether or not the target data derived by the past processing and that derived by the just-before processing are associated with the same target (Step S15).

Next, the filtering unit 74 smooths, in a time-axis direction, parameters (longitudinal distance, lateral distance, and relative velocity) of the two target data derived by processes of the past processing and the just-before processing so as to derive target data (internal-filter data) (filtering, Step S16). Next, the target classifying unit 75 classifies each of the targets into a preceding vehicle, a stationary object (including stationary vehicle), and an on-coming vehicle on the basis of the relative velocity (Step S17).

Next, the unnecessary target removing unit 76 determines, as an unnecessary target, an upper object, a lower object, raindrops, and the like among from targets, and removes the unnecessary target from an output target (Step S18). Among the processes of Step S18, a process for removing the upper object from the output target will be mentioned later with reference to FIG. 19B.

Next, the grouping unit 77 performs grouping that integrates a plurality of target data into one as target data on the same object (Step S19). Next, the target-information outputting unit 78 selects, as an output target, a predetermined number of target data among from derived or derived by the extrapolation among from a plurality of target data, and outputs the selected target data to the vehicle controlling device 2 (Step S20). When Step S20 is completed, the signal processing unit 6 terminates the target-information deriving process.

Unneeded-Target Removal According to First Embodiment

FIG. 19B is a flowchart illustrating a subroutine of an unneeded-target removal according to the first embodiment. In FIG. 19B, a processing procedure for removing an upper object according to the first embodiment in the unneeded-target removal of Step S18 illustrated in FIG. 19A is illustrated.

First, the unnecessary target removing unit 76 computes, on the basis of the aforementioned formula (2), a lateral-position difference of the target (Step S18-1). Next, the unnecessary target removing unit 76 computes, on the basis of the lateral-position difference computed in Step S18-1 and the aforementioned formula (1), the probability ratio 1 based on the lateral-position difference (Step S18-2).

Next, the unnecessary target removing unit 76 computes, on the basis of the aforementioned formula (3), a relative-velocity difference of the target (Step S18-3). Next, the unnecessary target removing unit 76 computes, on the basis of the relative-velocity difference computed in Step S18-3 and the aforementioned formula (1), the probability ratio 2 based on the relative-velocity difference (Step S18-4).

Next, the unnecessary target removing unit 76 computes, on the basis of the aforementioned formula (4), an independent beam-slope difference (Step S18-5). Next, the unnecessary target removing unit 76 computes, on the basis of the independent beam-slope difference computed in Step S18-5 and the aforementioned formula (1), the probability ratio 3 based on the independent beam-slope difference (Step S18-6).

Next, the unnecessary target removing unit 76 computes, on the basis of the aforementioned formula (5), an upward-downward beam power difference slope (Step S18-7). Next, the unnecessary target removing unit 76 computes, on the basis of the upward-downward beam power difference computed in Step S18-7 and the aforementioned formula (1), the probability ratio 4 based on the upward-downward beam power difference slope (Step S18-8).

Next, the unnecessary target removing unit 76 computes, on the basis of the aforementioned formula (6), an upward-downward beam area differential (Step S18-9). Next, the unnecessary target removing unit 76 computes, on the basis of the upward-downward beam area differential computed in Step S18-9 and the aforementioned formula (1), the probability ratio 5 based on the upward-downward beam area differential (Step S18-10).

Next, the unnecessary target removing unit 76 specifies presence/absence of an extrapolation and an extrapolation-factor type (Step S18-11). Next, the unnecessary target removing unit 76 computes the probability ratio 6 on the basis of the presence/absence of the extrapolation and the extrapolation-factor type, which are specified in Step S18-11, and the aforementioned formula (1) (Step S18-12).

Next, the unnecessary target removing unit 76 computes the probability ratio OverAll on the basis of the aforementioned formula (7) (Step S18-13). Next, the unnecessary target removing unit 76 determines whether or not the probability ratio OverAll computed in Step S18-13 is equal to or more than a threshold. When the probability ratio OverAll is equal to or more than the threshold (Step S18-14: Yes), the unnecessary target removing unit 76 determines the target object to be a stationary vehicle (Step S18-15). On the other hand, when the probability ratio OverAll is less than the threshold (Step S18-14: No), the unnecessary target removing unit 76 determines the target object to be an upper object (Step S18-16). When Step S18-15 or Step S18-16 is completed, the unnecessary target removing unit 76 shifts the process to Step S19 illustrated in FIG. 19A.

In the first embodiment, with respect to a plurality of parameters, values and occurrence frequencies thereof, which can be taken by a stationary vehicle and an upper object, are used as probability density functions, and a stationary-vehicle probability (stationary-vehicle likelihood) and an upper-object probability (upper-object likelihood) of a present value are computed on the basis of the probability density functions of the respective parameters. Moreover, in the first embodiment, a Bayesian update is performed, which updates a preliminarily probability with a posterior probability for each data acquisition. By repeating the aforementioned process, a stationary vehicle and an upper object are discriminated in manner of the Bayesian filter by using the logarithmic ratios between the stationary-vehicle probability and the upper-object probability.

According to the first embodiment, whether or not a target detected in a traveling direction of an own vehicle is a target that is to collide with the own vehicle (for example, whether or not target needs vehicle control such as brake control) can be identified from appoint of relatively long distance (for example, from approximately 80 m before target) away while improving a detection rate, and thus a vehicle control based on the target detection can be operated with an appropriate timing and an appropriate instruction.

In the first embodiment, each of the probability ratios 1 to 6 is a parameter that hardly receives an effect caused by an attachment height to the own vehicle A and a perpendicular attachment angle of the radar device 1, and thus the stationary vehicle and the upper object can be discriminated with high precision independent of a mount condition of the radar.

Second Embodiment

Figure 20:
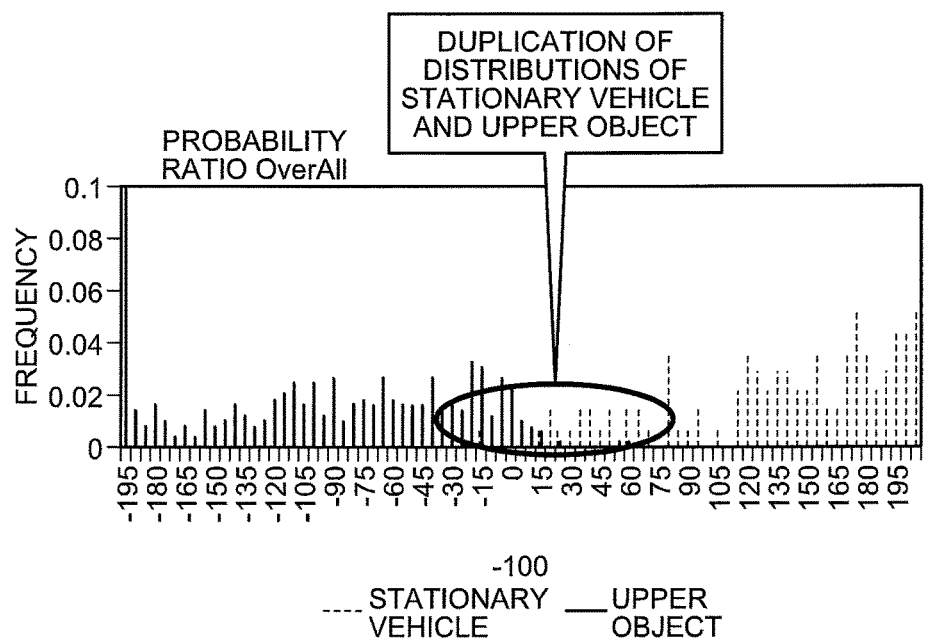
FIG. 20 is a diagram illustrating duplication between probability-ratio distributions of the stationary vehicle and the upper object.

In the aforementioned first embodiment, there exists, in some cases, a case in which a stationary vehicle and an upper object are not sufficiently discriminated. In other words, as illustrated in FIG. 20, there exists a range in which values of the probability ratios OverAll based on a plurality of parameters duplicate between a stationary vehicle and an upper object. FIG. 20 is a diagram illustrating duplication between probability-ratio distributions of the stationary vehicle and the upper object. Therefore, in a second embodiment described below, in order to improve determination precision, a method for disconnecting the probability ratios OverAll will be explained.

Hereinafter, causes ($H_i$) (i=1, 2) are defined as the following table 1.

TABLE 1

| Cause | Definition |
|---|---|
| $H_1$ | Target object is stationary vehicle |
| $H_2$ | Target object is upper object |

Parameters ($D_j$) (j=1 to 7) are defined as the following table 2. All of $D_1$ to $D_7$ in the following table 2 are assumed to be independent of one another.

TABLE 2

| Parameter | Definition |
|---|---|
| $D_1$ | Probability ratio based on lateral-position difference computed by present scan (probability ratio 1) |
| $D_2$ | Probability ratio based on relative-velocity difference computed by present scan (probability ratio 2) |
| $D_3$ | Probability ratio based on independent beam-slope difference computed by present scan (probability ratio 3) |
| $D_4$ | Probability ratio based on upward-downward beam power difference computed by present scan (probability ratio 4) |
| $D_5$ | Probability ratio based on upward-downward beam area differential computed by present scan (probability ratio 5) |
| $D_6$ | Probability ratio based on extrapolation-factor type computed by present scan (probability ratio 6) |
| $D_7$ | Probability ratio based on upward-downward beam comprehensive dispersion computed by present scan (probability ratio 7) |

In this case, a posterior probability P ($H_1|D$) that is a probability of a target object being a stationary vehicle is indicated as the following formula (8-1) on the basis of the parameters D ($D_1$ to $D_7$). A posterior probability P ($H_2|D$) that is a probability of a target object being an upper object is indicated as the following formula (8-2) on the basis of the parameters D ($D_1$ to $D_7$).

$$P(H_1|D) = (H_1|D_1, D_2, D_3, D_4, D_5, D_6, D_7) \tag{8-1}$$

$$P(H_2|D) = (H_2|D_1, D_2, D_3, D_4, D_5, D_6, D_7) \tag{8-2}$$

When using a naive Bayesian filter, the determination between a stationary vehicle and an upper object is performed by using a logit (Logit) obtained by computing, as the following formula (9), a logarithm of the probability ratio of the stationary vehicle to that of the upper object.

$$\text{Logit} = \log\{P(H_1 \mid D) / P(H_2 \mid D)\} \quad (9)$$
$$= \log\{P(D \mid H_1)P(H_1) / P(D \mid H_2)P(H_2)\}$$

Herein, the parameters D ($D_1$ to $D_7$) are assumed to be independent of one another, and thus P (D|$H_1$) and P (D|$D_2$) can be expressed as the respective following formulae (10-1) and (10-2).

$$P(D|H_1)=P(D_1|H_1)P(D_2|H_1)P(D_3|H_1)P(D_4|H_1)P(D_5|H_1)P(D_6|H_1)P(D_7|H_1) \quad (10\text{-}1)$$

$$P(D|H_2)=P(D_1|H_2)P(D_2|H_2)P(D_3|H_2)P(D_4|H_2)P(D_5|H_2)P(D_6|H_2)P(D_7|H_2) \quad (10\text{-}2)$$

The aforementioned formula (9) is transformed by using the aforementioned formulae (10-1) to (10-2) into the following formulae (11-1) to (11-2).

$$\text{Logit} = \log\{P(H_1 \mid D)/P(H_2 \mid D)\} \quad (11\text{-}1)$$
$$= \log\{P(D_1 \mid H_1)\} - \log\{P(D_1 \mid H_2)\} \rightarrow x_1 +$$
$$\log\{P(D_2 \mid H_1)\} - \log\{P(D_2 \mid H_2)\} \rightarrow x_2 +$$
$$\log\{P(D_3 \mid H_1)\} - \log\{P(D_3 \mid H_2)\} \rightarrow x_3 +$$
$$\log\{P(D_4 \mid H_1)\} - \log\{P(D_4 \mid H_2)\} \rightarrow x_4 +$$
$$\log\{P(D_5 \mid H_1)\} - \log\{P(D_5 \mid H_2)\} \rightarrow x_5 +$$
$$\log\{P(D_6 \mid H_1)\} - \log\{P(D_6 \mid H_2)\} \rightarrow x_6 +$$
$$\log\{P(D_7 \mid H_1)\} - \log\{P(D_7 \mid H_2)\} \rightarrow x_7 +$$
$$\log\{P(H_1)\} - \log\{P(H_2)\} \rightarrow x_0 \quad (11\text{-}2)$$

As indicated by the aforementioned formula (11-2), let the first, second, . . . , seventh, and eighth terms of the aforementioned formula (11-2) be $x_1$, $x_2$, . . . , $x_7$, and $x_0$, respectively, the aforementioned formula (11-2) can be expressed as the following formula (12).

$$\text{Logit}=(x_1+x_2+x_3+x_4+x_5+x_6+x_7)+x_0 \quad (12)$$

A part in parentheses of the aforementioned formula (12) can be interpreted as a generalized linear model that uses $x_1$ to $x_7$ as estimation variables. Therefore, in the second embodiment, a regression coefficient and an intercept are decided by a multivariable analysis of the part in parentheses of the aforementioned formula (12), thereby improving discrimination precision between a stationary vehicle and an upper object.

The target data used in the discrimination between a stationary vehicle and an upper object is qualitative data on, for example, the stationary vehicle and the upper object. The normality is not assumed in all of the estimation variables (probability ratio 1 ($x_1$) to probability ratio 7 ($x_7$)). Thus, a logistic regression analysis is employed as a method for a multivariable analysis so as to perform selection and integration of the estimation variables in view of multicollinearity and an Akaike's Information Criterion (AIC), and thus a regression coefficient (weight coefficient) and an intercept are decided for each 10 m of detection distance. However, when the detection distance is less than 10 m, the regression coefficient (weight coefficient) and the intercept are computed by using a linear interpolation.

In the second embodiment, weight coefficient•intercept table A 63g to be mentioned later in a case of a first distance in which a first detection distance of a target is, for example, 80 to 110 m and a weight coefficient•intercept table B 63h to be mentioned later in a case of the first detection distance that is other than the first distance are switched and used so as to improve discrimination precision between the stationary vehicle and the upper object.

Figure 21:
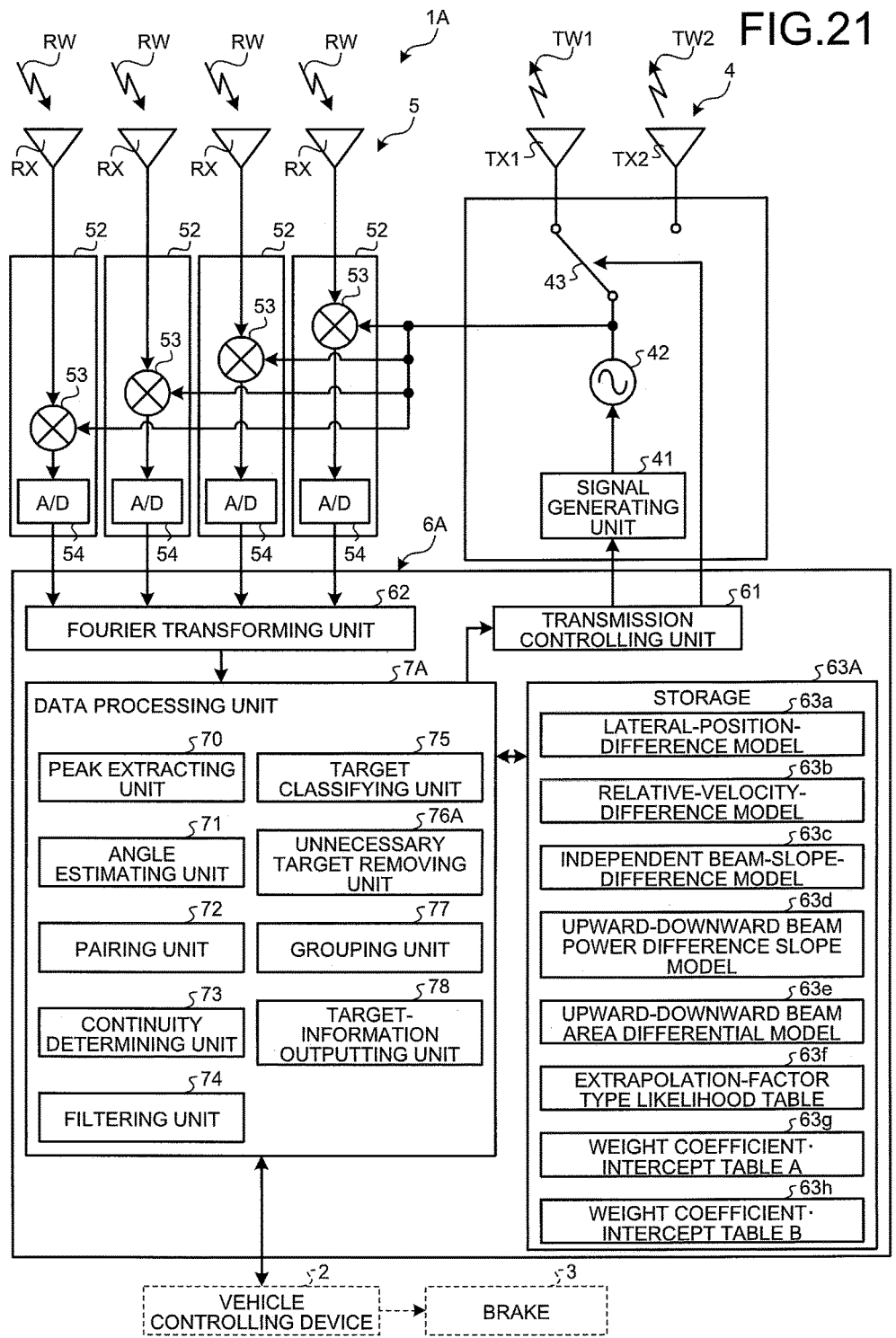
FIG. 21 is a diagram illustrating a configuration of a radar device according to a second embodiment.
Figure 22A:
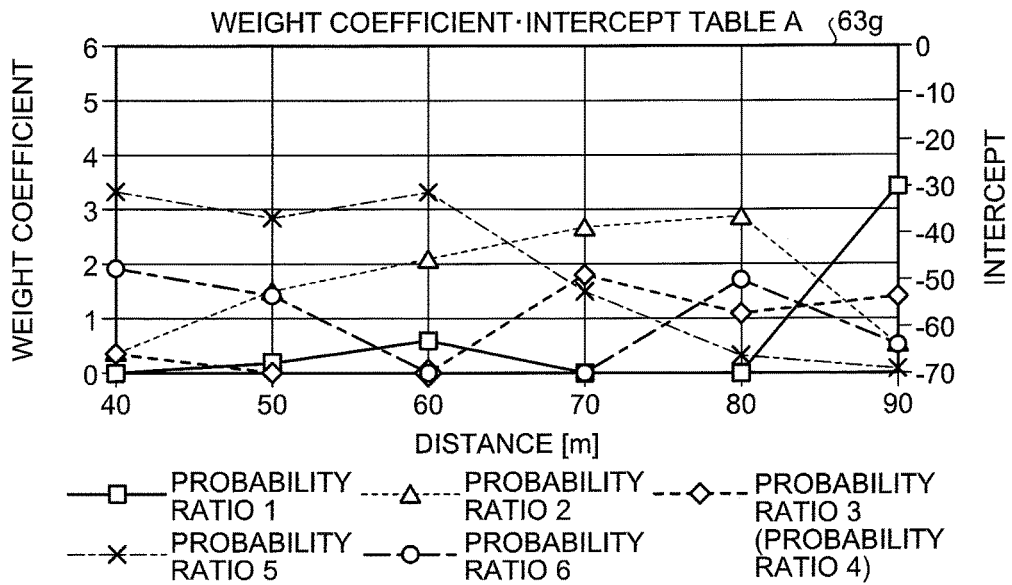
FIG. 22A is a diagram illustrating a table A that stores a weight coefficient and an intercept regressing each probability ratio in accordance with a first detection distance according to the second embodiment.
Figure 22B:
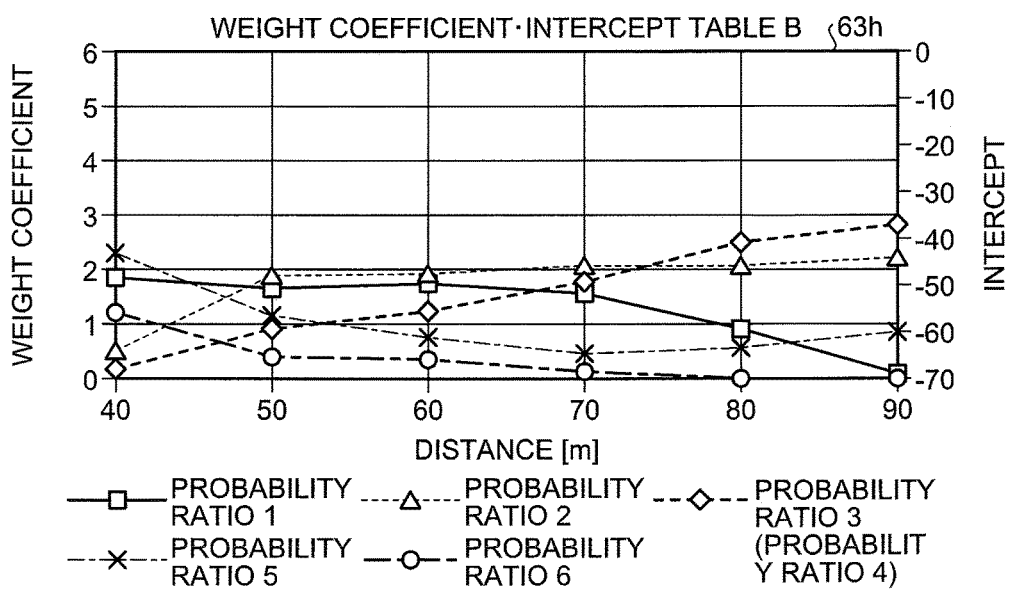
FIG. 22B is a diagram illustrating a table B that stores the weight coefficient and the intercept regressing each of the probability ratios in accordance with the first detection distance according to the second embodiment.

Outline of Target Detection Performed by Radar Device According to Second Embodiment FIG. 21 is a diagram illustrating a configuration of a radar device according to the second embodiment. FIG. 22A is a diagram illustrating a table A that stores a weight coefficient and an intercept regressing each probability ratio in accordance with the first detection distance according to the second embodiment. FIG. 22B is a diagram illustrating a table B that stores the weight coefficient and the intercept regressing each of the probability ratios in accordance with the first detection distance according to the second embodiment.

As illustrated in FIG. 21, a radar device 1A according to the second embodiment includes a signal processing unit 6A, a data processing unit 7A, and a storage 63A. The data processing unit 7A of the signal processing unit 6A includes an unnecessary target removing unit 76A. The storage 63A further stores the weight coefficient•intercept table A 63g illustrated in FIG. 22A and the weight coefficient•intercept table B 63h illustrated in FIG. 22B. Other configurations of the radar device 1A according to the second embodiment is similar to that of the radar device 1 according to the first embodiment.

When a first detection distance of a target object is a first distance of, for example, 80 to 110 m, the weight coefficient•intercept table A 63g illustrated in FIG. 22A stores a weight coefficients $\alpha_i$ and an intercepts $\beta$ to be used in correcting the probability ratios i (i=1 to 3, 5 to 6) for each first detection distance. When the first detection distance of the target is other than the aforementioned first distance, the weight coefficient•intercept table B 63h illustrated in FIG. 22B stores the weight coefficients $\alpha_i$ and the intercepts $\beta$ that correct the corresponding probability ratios i (i=1 to 3, 5 to 6) for each first detection distance.

In FIGS. 22A and 22B, by selection of an estimation variable (parameter) based on the aforementioned multicollinearity and AIC, the parameters $D_1$ to $D_6$, in other words, the probability ratios 1 to 6 are selected, and a probability ratio corresponding to the parameter $D_7$ is removed. In FIGS. 22A and 22B, by integration of the estimation variables (parameters), the parameters $D_3$ and $D_4$, in other words, the probability ratios 3 and 4 are integrated into one. Thus, the weight coefficients $\alpha_i$ and the intercepts $\beta$ (i=1 to 3, 5 to 6) corresponding to the probability ratios 1 to 3 and 5 to 6 illustrated in FIGS. 22A and 22B are stored for each first detection distance.

The unnecessary target removing unit 76A performs, on the basis of the following formula (13), regressing correction on each of the probability ratios i (i=1 to 6) that are computed similarly to the aforementioned first embodiment by using a weight coefficient and an intercept read from the weight coefficient•intercept table A 63g or the weight coefficient•intercept table B 63h in accordance with a first detection distance so as to compute the corrected probability ratio OverAll.

$$\text{Corrected Probability Ratio Over All} = \quad (13)$$
$$(\alpha_1 \times \text{Probability Ratio } 1 + \beta) + (\alpha_2 \times \text{Probability Ratio } 2 + \beta) +$$
$$\alpha_3 \times \left( \frac{\text{Probability Ratio } 3 + \text{Probability Ratio } 4}{2} \right) + \beta +$$
$$\alpha_5 \times \text{Probability Ratio } 5 + \beta + \alpha_6 \times \text{Probability Ratio } 6 + \beta$$

When the first detection distance is the aforementioned first distance, the unnecessary target removing unit 76A reads, from the weight coefficient•intercept table A 63g, the weight coefficients $\alpha_i$ and the intercepts β (i=1 to 6) of the probability ratios i corresponding to the distance of each scan. On the other hand, when the first detection distance is other than the aforementioned first distance, the unnecessary target removing unit 76A reads, from the weight coefficient•intercept table B 63h, the weight coefficients $\alpha_i$ and the intercepts β (i=1 to 6) of the probability ratios i corresponding to the distance of each scan. A change in values, according to the detection distance of the target, of the weight coefficients $\alpha_i$ and the intercepts β (i=1 to 6) read from the weight coefficient•intercept table A 63g when the first detection distance is the first distance is relatively larger than those of the weight coefficients $\alpha_i$ and the intercepts β (i=1 to 6) read from the weight coefficient•intercept table B 63h when the first detection distance is other than the first distance. The unnecessary target removing unit 76A computes, on the basis of the aforementioned formula (13), the corrected probability ratio OverAll by using the weight coefficients $\alpha_i$ and the intercepts β (i=1 to 6) of the respective read probability ratios i and the probability ratios i.

In the second embodiment, with respect to the probability ratio on which the Bayesian update is performed for each scan, when the probability ratio OverAll is computed from the parameters (probability ratio 1 to 6), the weighting using the weight coefficients and the intercepts obtained by the logistic regression analysis is performed, which is different in accordance with a first detection distance of a target object. Thus, in the second embodiment, discrimination precision between a stationary vehicle and an upper object can be improved.

As described above, "probability ratio 1" is logarithmic likelihoods of a stationary vehicle and an upper object based on the parameter "lateral-position difference". "Probability ratio 2" is logarithmic likelihoods of a stationary vehicle and an upper object based on the parameter "relative velocity difference". "Probability ratio 3" is logarithmic likelihoods of a stationary vehicle and an upper object based on the parameter "independent beam-slope difference". "Probability ratio 4" is logarithmic likelihoods of a stationary vehicle and an upper object based on the parameter "upward-downward beam power difference slope". "Probability ratio 5" is logarithmic likelihoods of a stationary vehicle and an upper object based on the parameter "upward-downward beam area differential". "Probability ratio 6" is logarithmic likelihoods of a stationary vehicle and an upper object based on the parameter "extrapolation-factor type".

Herein, features of the weight coefficient of the probability ratio in the weight coefficient•intercept table A 63g illustrated in FIG. 22A will be explained. A value of the weight coefficient $\alpha_1$ of the probability ratio 1 when the distance is relatively large (for example, more than 80 m) is larger than that when the distance is relatively small (for example, 80 m or less). This is because, the lateral-position difference of the upper object when the distance of the target is relatively large is larger than that when the distance of the target is relatively small, and thus an importance degree as a parameter for determining whether this target is the stationary vehicle or the upper object is high. Thus, a value of the weight coefficient $\alpha_1$ of the probability ratio 1 when the distance of the target is relatively large is larger than that when the distance of the target is relatively small.

A value of the weight coefficient $\alpha_2$ of the probability ratio 2 when the distance is relatively small is larger than that when the distance is relatively large. This is because the reflection intensity of the reflected wave from the target is larger as the distance is smaller and a relative-velocity difference of the target is to be computed precisely, and thus an importance degree as a parameter for discriminating between the stationary vehicle and the upper object is high. However, when the distance of the target is small (for example, 60 meters or less), the value of the weight coefficient $\alpha_2$ becomes small. This is because, when the distance is smaller, the target is out of a transmission range of the transmission wave of the radar device 1, and thus the reflected wave is not received.

Moreover, a value of the weight coefficient $\alpha_5$ of the probability ratio 5 when the distance is relatively small is larger than that when the distance is relatively large. This is because more results of the area differential are acquired as the distance is smaller, and thus an importance degree as a parameter for discriminating between the stationary vehicle and the upper object is high. The weight coefficients of various parameters are changed in accordance with the distance to the target while focusing on value changes of various parameters according to the distance to the stationary vehicle and value changes of various parameters according to the distance to the upper object, and thus the stationary vehicle and the upper object can be discriminated precisely.

When the distance (first detection distance) at which the radar device 1 first detects a target to be detected is other than the first distance (for example, 80 to 110 m), the weight coefficient $\alpha_i$ is computed by using the weight coefficient•intercept table B 63h illustrated in FIG. 22B. When the first detection distance of the target is the first distance, the weight coefficient $\alpha_i$ is computed by using the weight coefficient•intercept table A 63g illustrated in FIG. 22A. Thus, in computing the weight coefficient $\alpha_i$, the weight coefficient $\alpha_i$ is computed by using the weight coefficient•intercept table B 63h illustrated in FIG. 22B, when the distance of the target becomes a specific distance such as the first distance, the weight coefficient $\alpha_i$ is computed by using another table (weight coefficient•intercept table A 63g illustrated in FIG. 22A) having the same kinds of parameters and whose values of the weight coefficients are different. Therefore, optimum weighting can be performed, in accordance with the distance to the target, on the parameters used for discrimination of a kind of the target, and thus the kind of this target can be discriminated reliably.

Modification of First and Second Embodiments (1) Probability Ratio OverAll

In the first embodiment, when the probability ratio OverAll (similarly to corrected probability ratio OverAll according to second embodiment) is equal to or more than a threshold, a target object is determined to be a stationary vehicle, and when the probability ratio OverAll is less than the threshold, the target object is determined to be an upper object. However, not limited thereto, when whether or not the target object is a stationary vehicle is determined by comparing "reliability of stationary vehicle" with the threshold, the probability ratio OverAll may be converted as a magnification C that is to be raised to "reliability of stationary vehicle" so as to be used. In other words, when "reliability of stationary vehicle to be used for threshold determination=C×(reliability of stationary vehicle)" is equal to or more than a predetermined threshold, this target object is determined to be the stationary vehicle.

Herein, "reliability of stationary vehicle" is an indicator having a value within a range of, for example, 0 to 100, which indicates whether or not the target data is data according to the stationary vehicle, and further indicates that a probability of being the stationary vehicle is higher as the numerical value is higher. "Reliability of stationary vehicle" is computed by using a plurality of pieces of information (for example, "longitudinal distance", "angle power", "extrapolation frequency", etc.) included in the target data.

For example, two thresholds of thresholds 1 and 2 (threshold 1>threshold 2) are assumed to be provided. When "probability ratio OverAll≥threshold 1" is satisfied, the magnification C=1. This indicates that "reliability of stationary vehicle" can be determined to be high, and thus "reliability of stationary vehicle" is used as it is for the threshold determination of whether or not, for example, the target object is the stationary vehicle. When "threshold 2≥probability ratio OverAll" is satisfied, the magnification C=0. This indicates that "reliability of stationary vehicle" can be determined to be low, and thus "reliability of stationary vehicle" is set to be zero and the target object is prevented from being determined to be the stationary vehicle.

When "threshold 1>probability ratio OverAll>threshold 2" is satisfied, the magnification C is obtained by "magnification C=(probability ratio OverAll−threshold 2)/(threshold 1−threshold 2)". In other words, the magnification C indicates an exceeded ratio of the probability ratio OverAll to the threshold 2 between the threshold 1 and the threshold 2. For example, when "C=0.5" is satisfied, "reliability of stationary vehicle to be used for threshold determination" obtained by computing "reliability of stationary vehicle" raised to the power 0.5 is used for the threshold determination of whether or not, for example, the target is the stationary vehicle.

Thus, the probability ratio OverAll is converted into the magnification C to be raised to "reliability of stationary vehicle" so as to broaden a determination line for whether or not, for example, the target object is the stationary vehicle, and thus the stationary vehicle can be discriminated more comprehensively in consideration of various factors.

(2) Discrimination Between Stationary Vehicle and Other than Stationary Vehicle

In the first and the second embodiments, a Bayesian-filter method for computing various parameters on the stationary vehicle and the upper object for each target detection, and updating logarithmic likelihood ratios of a stationary vehicle or an upper object corresponding to the various parameters on the basis of the likelihood models, which model correlations between the various parameters and likelihoods of the stationary vehicle and the upper object for each detection distance, so as to discriminate between the stationary vehicle and the upper object. However, not limited thereto, a method similar to that of a Bayesian filter may be applied to discrimination between the stationary vehicle and a target (for example, lower object and the like) other than the stationary vehicle.

For example, various parameters on a stationary vehicle and a target other than the stationary vehicle are computed for each target detection, and likelihood models are constructed, which model correlations between the various parameters and likelihoods of the stationary vehicle and the target other than the stationary vehicle for each detection distance. Logarithmic likelihood ratios between the stationary vehicle and the target other than the stationary vehicle corresponding to the various parameters may be updated on the basis of these likelihood models so as to discriminate between the stationary vehicle and the target other than the stationary vehicle.

Third Embodiment

Next, the radar device 1 according to a third embodiment will be explained. Hereinafter, a part different from the first embodiment will be mainly explained, and explanation of a part having duplicated contents is omitted.

In the aforementioned first embodiment, the determination (hereinafter, may be referred to as "target-object determination") of whether a target object is a stationary vehicle or an upper object is performed by using the probability ratio OverAll as an indicator in the unneeded-target removing process (see FIG. 19B). The probability ratio OverAll is one example of a first indicator.

It has already been explained with reference to FIG. 20 that there exists a range in which values of the aforementioned probability ratios OverAll of the stationary vehicle and the upper object overlap with each other. Therefore, in the third embodiment, the target-object determination is performed by additionally using indicators other than the probability ratio OverAll.

Thus, in the third embodiment, by employing, for example, the probability ratio OverAll, even a target on which determination of whether the target is a stationary vehicle or an upper object is not clearly performed can be determined with high precision.

Hereinafter, more specifically, when the target object (target T) is, for example, the stationary vehicle (target T1), because a reflected wave from the stationary vehicle is received in the front of the receiving unit RX more easily as the own vehicle A is closer to the stationary vehicle, an angle power, which is a received power of the reflected wave, is inclined to rise in the radar device 1 (see FIG. 1) mounted on the own vehicle A.

On the other hand, in the radar device 1, when the target is, for example, the upper object (target T2), because, for example, the target leaves further from a main transmitting region of the transmission wave as the own vehicle A is closer to the upper target, the angle power is inclined to attenuate or goes in a state where no change occurs.

Thus, in the third embodiment, a characteristic in which the angle power easily attenuates when the target object is the upper object is focused on, a second indicator is computed which indicates an attenuated amount of the angle power according to a detection distance (longitudinal distance to target) of the target object so as to perform a target determination on the basis of the second indicator. As the second indicator, for example, an attenuated-amount area A1 (see FIG. 23A and the like) can be used, and is to be mentioned later.

In the third embodiment, a characteristic in which the angle power easily rises when the target object is the stationary vehicle is focused on, a third indicator is computed which indicates an increased value of the angle power according to a detection distance of the target so as to perform a target determination on the basis of the third indicator. As the third indicator, for example, an increased-amount area A2 (see FIG. 24A and the like) to be mentioned later can be used.

Hereinafter, first, the attenuated-amount area A1 that is the second indicator will be explained. The unnecessary target removing unit 76 computes the attenuated-amount area A1 on the basis of the following formula (14).

$$\text{Attenuated-Amount Area } A1 = \Sigma\{(\text{Present Angle Power} - \text{Reference Power}) \times \text{Previous-Present Distance Difference}\} \quad (14)$$

Figure 23A:
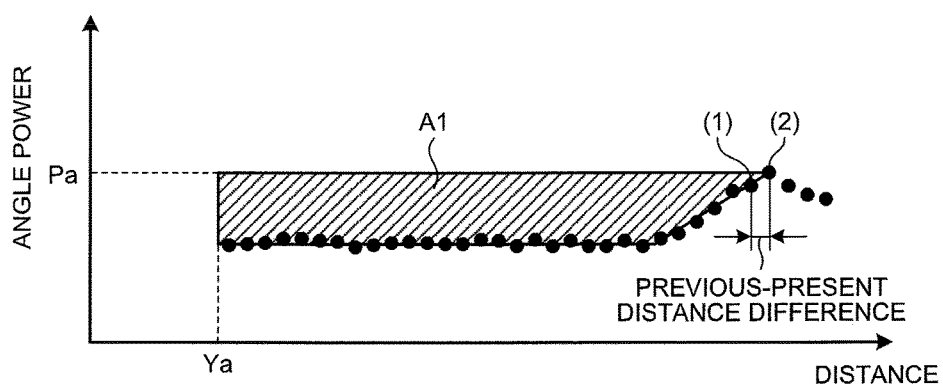
FIGS. 23A and 23B are diagrams explaining a method for computing an attenuated-amount area according to a third embodiment.
Figure 23B:
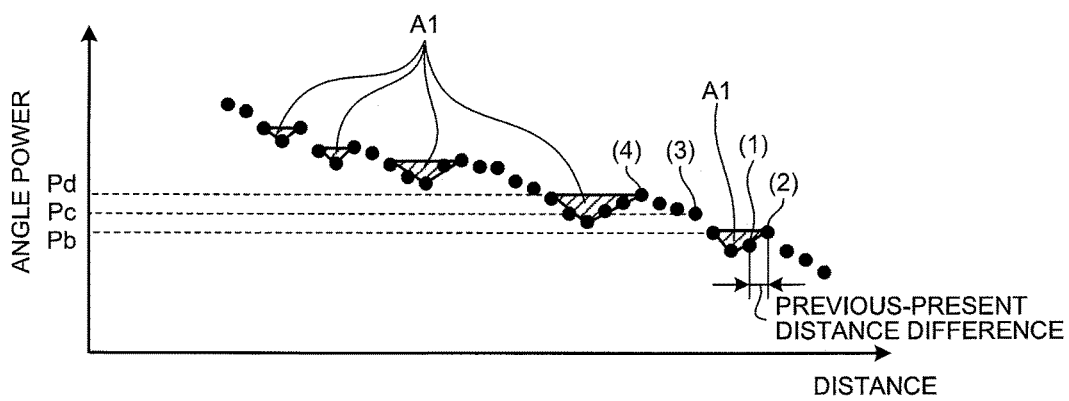

FIGS. 23A and 23B are diagrams explaining a method for computing the attenuated-amount area A1 according to third embodiment. FIGS. 23A and 23B are graphs in each of which a horizontal axis indicates a distance (detection distance), and a vertical axis indicates an angle power. In FIG. 23A, one example of a graph when the target object is an upper object is illustrated, and in FIG. 23B, one example of a graph when the target object is a stationary vehicle is illustrated.

When an angle power of the present processing corresponds to, for example, (1) illustrated in FIG. 23A, the unnecessary target removing unit 76 sets a maximum value among the angle powers up to the present processing to be a reference power. In the example illustrated in FIG. 23A, because an angle power Pa (corresponding to (2) illustrated in FIG. 23A) of the previous processing is a maximum value, the unnecessary target removing unit 76 sets this angle power Pa to be a reference power.

The unnecessary target removing unit 76 computes, as in the formula (14), values each of which is obtained by multiplying a difference, which is obtained by subtracting the reference power (corresponding to (2) illustrated in FIG. 23A) from the angle power (corresponding to (1) illustrated in FIG. 23A) acquired in the present processing, by a distance difference (previous-present distance difference) between the distance of the previous processing and that of the present processing, and accumulates the values so as to compute the attenuated-amount area A1. In other words, the unnecessary target removing unit 76 computes the attenuated-amount area A1 by using, for example, a sectional mensuration.

Therefore, as illustrated in FIG. 23A, when the target object is the upper object, because the angle power attenuates more as, for example, the own vehicle A is closer to the upper object, the attenuated-amount area A1 increases each time when the computation process of the formula (14) is repeated. In FIG. 23A, the attenuated-amount area A1 when the target object approaches to a distance Ya is illustrated by using an enclosed diagonal lines.

On the other hand, as illustrated in FIG. 23B, the attenuated-amount area A1 when the target object is the stationary vehicle does not increase compared with the case of the upper object. Specifically, when the angle power of the present processing corresponds to, for example, (1) illustrated in FIG. 23B, because an angle power Pb (corresponding to (2) illustrated in FIG. 23B) of the previous processing is a maximum value, the unnecessary target removing unit 76 sets the angle power Pb to be a reference power.

The unnecessary target removing unit 76 computes values each of which is obtained by multiplying a difference obtained by subtracting the reference power (corresponding to (2) illustrated in FIG. 23B) from the angle power of the present processing (corresponding to (1) illustrated in FIG. 23B) by the previous-present distance difference, and accumulates the values so as to compute the attenuated-amount area A1.

Herein, when the target object is a stationary vehicle, the angle power temporarily attenuates due to an effect of a multipath and the like in some cases, however, the angle power basically rises as the stationary vehicle approaches. Therefore, in the example illustrated in FIG. 23B, when the angle power is an angle power Pc (corresponding to (3) illustrated in FIG. 23B) in, for example, the present processing, because the angle power Pc is larger than the angle power Pb that is the reference power, the unnecessary target removing unit 76 updates the reference power with the angle power Pc that is a new maximum value.

Thus, a value obtained from "present angle power (herein, angle power Pc)–reference power (herein, angle power Pc)" (formula (14)) is zero, and thus the attenuated-amount area A1 is not accumulated and does not increase.

In the example illustrated in FIG. 23B, because the angle power continues to rise up to an angle power Pd ((4) illustrated in FIG. 23B), the reference power also continues to be updated, and thus the attenuated-amount area A1 does not increase as the result. Therefore, in a case where the target object is a stationary vehicle, in the example illustrated in FIG. 23B, the attenuated-amount area A1 increases only slightly when the angle power temporarily attenuates due to an effect of a multipath and the like after the time of the angle power Pd (4).

The unnecessary target removing unit 76 compares the attenuated-amount area A1 computed as described above with a threshold A1a, when the attenuated-amount area A1 is equal to or more than the threshold A1a, determines that the target object is an upper object. When the attenuated-amount area A1 is less than the threshold A1a, the unnecessary target removing unit 76 determines that there exists a high probability of the target object not being an upper object, in other words, being a stationary vehicle.

Thus, in the third embodiment, the attenuated-amount area A1 that indicates the attenuated amount of the angle power according to the detection distance of the target object is used, and thus determination of whether the target object is the stationary vehicle or the upper object can be performed with high precision. In other words, by performing the determination using the integrated value of the attenuated amounts, in the plurality of target detecting processes, of the signal power on the target, whether the target is a stationary vehicle or an upper object can be determined more precisely than in a case where the determination is performed by an instantaneous value of the attenuated amount, in the one target detecting process, of the signal power on the target.

In the third embodiment, when the angle power of the present processing is larger than the reference power used in the previous processing, the reference power is updated with the angle power of the present processing.

Thus, for example, when the target object is a stationary vehicle and the angle power exhibits an inclination of continuing to rise (see FIG. 23B), easy increase in the attenuated-amount area A1 can be prevented. Therefore, the attenuated-amount area A1 is compared with the threshold A1a, when the attenuated-amount area A1 is less than the threshold A1a, it can be determined that the probability of the target being the stationary vehicle is high.

Next, the increased-amount area A2 that is the third indicator will be explained. The unnecessary target removing unit 76 computes the increased-amount area A2 on the basis of the following formula (15).

$$\text{Increased-Amount Area } A2 = \Sigma\{(\text{Present Angle Power} - \text{Reference Value}) \times \text{Previous-Present Distance Difference}\} \quad (15)$$

Figure 24A:
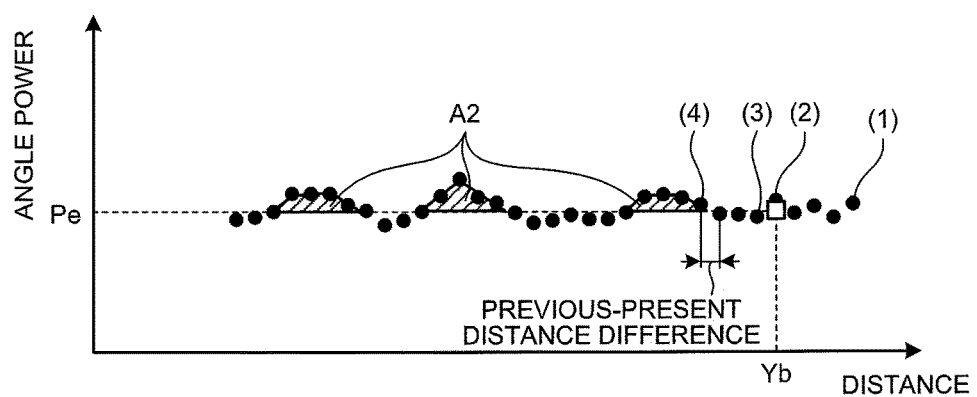
FIGS. 24A and 24B are diagrams explaining a method for computing an increased-amount area according to the third embodiment.
Figure 24B:
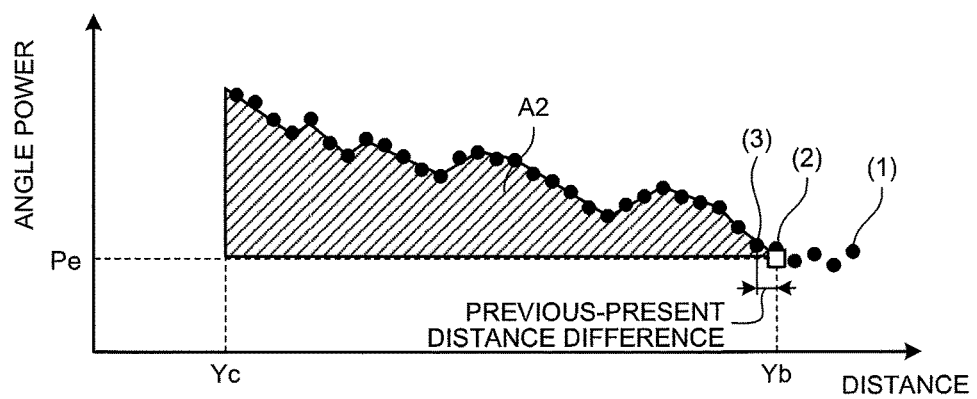

FIGS. 24A and 24B are diagrams explaining a method for computing the increased-amount area A2 according to the third embodiment. FIGS. 24A and 24B are graphs in each of which a horizontal axis indicates a distance (detection distance), and a vertical axis indicates an angle power. In FIG. 24A, one example of a graph when the target object is an upper object is illustrated, and in FIG. 24B, one example of a graph when the target object is a stationary vehicle is illustrated. In FIG. 24A, the state example is illustrated in which little change in the angle power occurs when the target object is the upper object.

Hereinafter, a method for computing the increased-amount area A2 will be explained first with reference to FIG. 24B. The unnecessary target removing unit 76 sets the reference value on the basis of the angle power when the detection distance of the target object is equal to or more than a prescribed distance Yb.

Specifically, the unnecessary target removing unit 76 computes an average value of angle powers corresponding to an interval from (1) to (2) illustrated in FIG. 24B during which a distance to a target object is equal to or more than the prescribed distance Yb. The unnecessary target removing unit 76 sets this average value (herein, referred to as "angle power Pe") as a reference value. In FIG. 24B and FIG. 24A to be mentioned later, the reference value is illustrated by using a white square mark.

The aforementioned prescribed distance Yb may be set to be an arbitrary value that is, for example, a relatively long value, specifically, a value causing a distance from the radar device 1 to a target to be long.

The unnecessary target removing unit 76 computes a difference obtained by subtracting the reference value (herein, "angle power Pe") from an angle power (for example, corresponding to (3) illustrated in FIG. 24B) acquired in the present processing. The unnecessary target removing unit 76 computes values each of which is obtained by multiplying this difference by a distance difference (previous-present distance difference) between a distance of the previous processing and a distance of the present processing, and accumulates the values so as to compute the increased-amount area A2.

Therefore, as illustrated in FIG. 24B, when the target object is the stationary vehicle, because the angle power rises more as, for example, the own vehicle A is closer to the stationary vehicle, the increased-amount area A2 increases each time when the computation process of the formula (15) is repeated. In FIG. 24B, the increased-amount area A2 when the target object approaches to a distance Yc is illustrated by using an enclosed diagonal lines.

On the other hand, as illustrated in FIG. 24A, the increased-amount area A2 when the target object is the upper object does not increase compared with the case of stationary vehicle because the angle power of the upper object hardly changes. Specifically, the unnecessary target removing unit 76 sets, as a reference value, an average value (angle power Pe) of angle powers corresponding to an interval from (1) to (2) illustrated in FIG. 24A during which a distance to a target object is equal to or more than the prescribed distance Yb.

The unnecessary target removing unit 76 computes a difference obtained by subtracting a reference value Pe from an angle power (for example, corresponding to (3) illustrated in FIG. 24A) of the present processing.

Herein, as described above, the increased-amount area A2 is an indicator that indicates an increased value of the angle power. Thus, when the difference is a negative value, in other words, when the angle power has attenuated, none of the difference and the angle power may be reflected in the increased-amount area A2.

Specifically, when a difference obtained by subtracting the reference value from an angle power of the present processing is a positive value, the unnecessary target removing unit 76 may perform the accumulation by using a value obtained by multiplying this difference by the previous-present distance difference so as to compute the increased-amount area A2.

Therefore, because the angle power (3) illustrated in FIG. 24A is smaller than a reference value (herein, angle power Pe), the difference has a negative value, and, for example, the angle power (3) is prevented from being reflected in the increased-amount area A2. In the example illustrated in FIG. 24A, a difference obtained by subtracting the reference value from an angle power (4) has a positive value, and thus the unnecessary target removing unit 76 performs the accumulation by using a value obtained by multiplying the difference by a previous-present distance difference so as to reflect, for example, the angle power (4) in the increased-amount area A2. Thus, with respect to the increased-amount area A2, only increased amounts of the angle power are accumulated, and thus precision of target determination to be mentioned later can be improved.

In the example illustrated in FIG. 24A, a change is hardly generated in the angle power, and thus the increased-amount area A2 increases only slightly when the angle power rises caused by a multipath effect to temporarily exceed the reference value.

The unnecessary target removing unit 76 compares the increased-amount area A2 computed in the aforementioned manner with a threshold A2a, and determines that the target object is an upper object when the increased-amount area A2 is less than the threshold A2a. When the increased-amount area A2 is equal to or more than the threshold A2a, the unnecessary target removing unit 76 determines that the target object is not an upper object, in other words, a probability of the target object being a stationary vehicle is high.

Thus, in the third embodiment, the increased-amount area A2, which indicates an increased value of the angle power according to a detection distance of the target object, is used, and thus determination of whether the target object is a stationary vehicle or an upper object can be performed with high precision.

When an instantaneous value is used as an angle power in the present processing when computing the attenuated-amount area A1 and the increased-amount area A2, responsiveness of the target-object determination can be improved. A numerical value of an instantaneous value of the angle power varies in some cases, whereas the attenuated-amount area A1 and the increased-amount area A2 are accumulated values, and thus this dispersion can be absorbed.

Unneeded-Target Removal According to Third Embodiment

Figure 25:
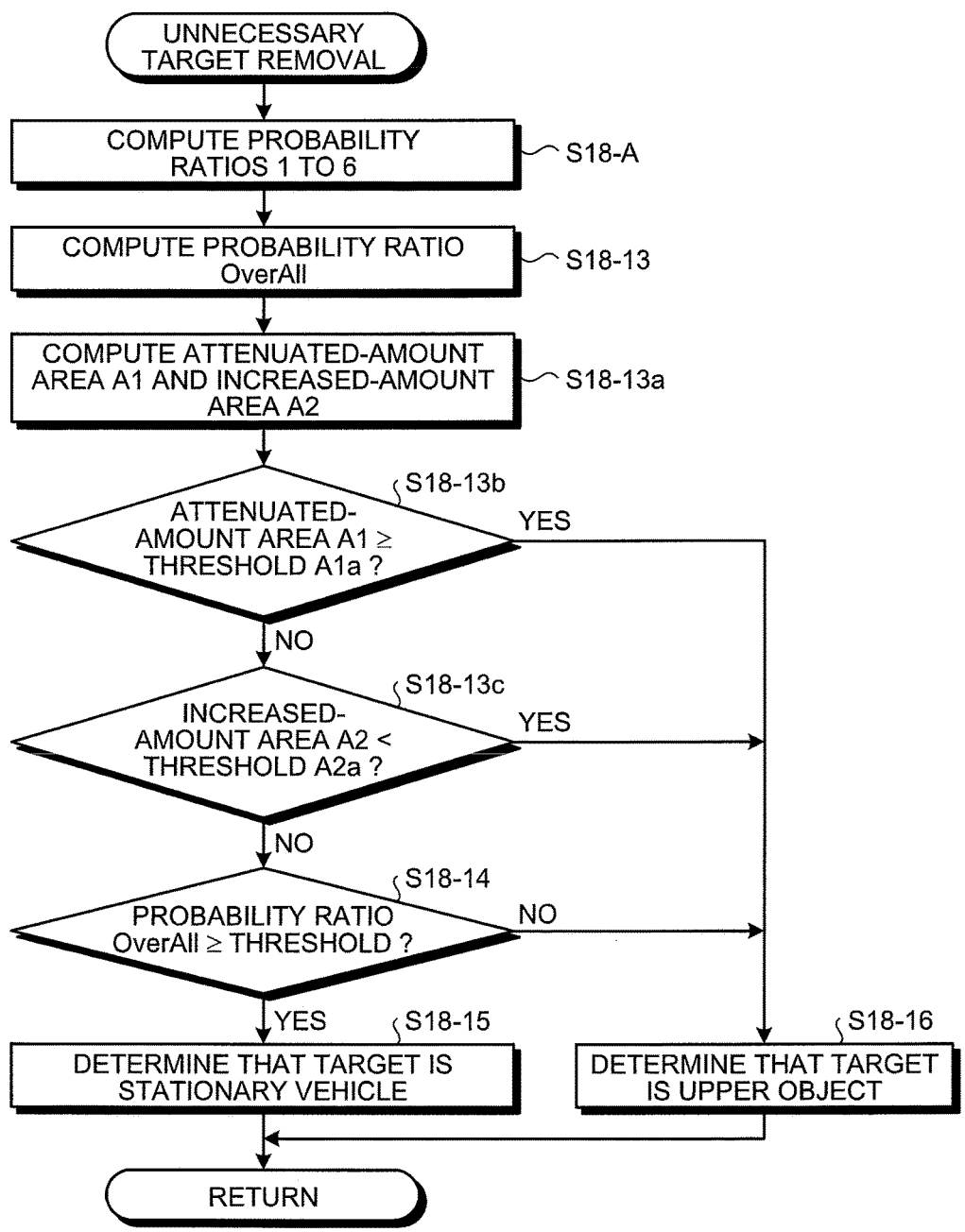
FIG. 25 is a flowchart illustrating a subroutine of an unneeded-target removal according to the third embodiment.

FIG. 25 is a flowchart illustrating a subroutine of an unneeded-target removal according to the third embodiment. The flowchart illustrated in FIG. 25 corresponds to that illustrated in FIG. 19B. In FIG. 25, processes for computing the probability ratios 1 to 6 from in Step S18-1 to Step S18-12 illustrated in FIG. 19B are collectively illustrated as Step S18-A.

As illustrated in FIG. 25, the unnecessary target removing unit 76 computes the probability ratio OverAll on the basis of the probability ratios 1 to 6 computed in Step S18-A (Step S18-13). Next, the unnecessary target removing unit 76 computes the attenuated-amount area A1 and the increased-amount area A2 (Step S18-13a).

Next, the unnecessary target removing unit 76 determines whether or not the computed attenuated-amount area A1 is equal to or more than the threshold A1a (Step S18-13b). When determining that the attenuated-amount area A1 is equal to or more than the threshold A1a (Step S18-13b: Yes), the unnecessary target removing unit 76 determines that the target object is an upper object (Step S18-16).

When the attenuated-amount area A1 is less than the threshold A1a (Step S18-13b: No), the unnecessary target removing unit 76 estimates that the target object has a high probability being the stationary vehicle, and subsequently determines whether or not the increased-amount area A2 is less than the threshold A2a (Step S18-13c).

When determining that the increased-amount area A2 is less than the threshold A2a (Step S18-13c: Yes), the unnecessary target removing unit 76 determines that the target object is an upper object (Step S18-16).

When determining that the increased-amount area A2 is equal to or more than the threshold A2a (Step S18-13c: No), the unnecessary target removing unit 76 estimates that the target object has a high probability being a stationary vehicle, and subsequently determines whether or not the probability ratio OverAll computed in Step S18-13 is equal to or more than a threshold or more (Step S18-14).

When determining that the probability ratio OverAll is the threshold or more (Step S18-14: Yes), the unnecessary target removing unit 76 determines that the target object is a stationary vehicle (Step S18-15). On the other hand, when determining that the probability ratio OverAll is less than the threshold (Step S18-14: No), the unnecessary target removing unit 76 determines that the target object is an upper object (Step S18-16).

Thus, in the third embodiment, the attenuated-amount area A1 and the increased-amount area A2 are used in the target determination, and thus, in such a case that the detected angle power indicates the target object is obviously an upper object, the target can be determined to be the upper object regardless of the probability ratio OverAll.

Therefore, in the third embodiment, a target-object determination can be performed with high precision even on a target object on which determination of whether the target object is a stationary vehicle or an upper object is hardly performed clearly by using, for example, the probability ratio OverAll.

In the third embodiment, the target-object determination is performed by using both the attenuated-amount area A1 and the increased-amount area A2. Thus, the target determination can be performed reliably.

In other words, a value of the angle power largely fluctuates by, for example, an effect of a multipath and the like in some cases. Thus, even when the target object is an upper object, depending on a value of the angle power, for example, one of the attenuated-amount area A1 and the increased-amount area A2 has in some cases no value indicating that the target object is an upper object.

Even in such a case, when the other of the attenuated-amount area A1 and the increased-amount area A2 has a value indicating that the target object is an upper object, the target object can be determined as the upper object. Namely, in the third embodiment, an effect caused by a multipath can be reduced, and thus the target determination can be performed reliably.

Specifically, even in a case where the target object is an upper object, when a height of the upper object from a road is less than a predetermined value, the attenuated-amount area A1 is in some cases less than the threshold A1a. In such a case, a value of the increased-amount area A2 of the upper object whose height from the road is less than the predetermined value is less than the threshold A2a. This is because the upper object exists at a position whose height from the road is larger than that of a stationary vehicle and is easily receives a multipath effect, and thus the increased-amount area A2 becomes smaller than that of the stationary vehicle. Thus, even in a case where the target is an upper object and the value of the attenuated-amount area A1 indicates an inclination of a stationary vehicle, when a value of the increased-amount area A2 is used in the determination, a type of the target object can be determined precisely.

Herein, when determining that the target object is an upper object precisely, the determination may be performed by using only the value of the increased-amount area A2. However, in a case where the target object is the upper object, when a vehicle height from a road of the vehicle (for example, truck and the like) is more than a predetermined value, a multipath effect is easily received. Thus, not only the determination that uses the increased-amount area A2 and strongly indicates its features when the target object is a stationary vehicle, but also the determination is performed, which uses the attenuated-amount area A1 and strongly indicates its features when the target object is an upper object. Thus, the target object, which satisfies all of conditions of a stationary vehicle by using a plurality of determination criteria, is determined to be a stationary vehicle.

Modification of Third Embodiment

Next, a modification of the third embodiment will be explained. In the modification of the third embodiment, the attenuated-amount area A1 or the increased-amount area A2 may be converted into the magnification C to be multiplied to "reliability of stationary vehicle" having been described in the modification of the first and second embodiments.

Specifically, when, for example, the attenuated-amount area A1 is equal to or more than the threshold A1a, because the target object can be determined to be an upper object, the magnification C may be set to be zero. Thus, "reliability of stationary vehicle" becomes zero, and thus the target object is prevented from being determined to be a stationary vehicle.

Similarly, when, for example, the increased-amount area A2 is less than the threshold A2a, because the target object can be determined to be an upper object, the magnification C is set to be zero so that "reliability of stationary vehicle" is turned into zero, and thus the target object is prevented from being determined to be a stationary vehicle.

In the aforementioned, the attenuated-amount area A1 or the increased-amount area A2 is converted into the magnification C, however not limited thereto, any of the attenuated-amount area A1 and the increased-amount area A2 may converted into, for example, a value that is added to or subtracted from "reliability of stationary vehicle".

In the aforementioned third embodiment, the processes for computing the attenuated-amount area A1 and the increased-amount area A2 and the processes for comparing the attenuated-amount area A1 and the increased-amount area A2 with the respective the thresholds A1a and A2a are executed after the process for computing the probability ratio OverAll, however is not limited thereto. In other words, the processes for computing the attenuated-amount area A1 and the increased-amount area A2 and the like may be executed before or simultaneously with the process for computing the probability ratio OverAll.

In the third embodiment, the target-object determination is performed by using both the attenuated-amount area A1 and the increased-amount area A2 that are the respective second and the third indicators, however is not limited thereto, for example, any one of the second and the third indicators may be used.

The aforementioned peak extracting unit 70, the angle estimating unit 71, the pairing unit 72, and the continuity determining unit 73 is one example of a deriving unit. The unnecessary target removing unit 76 is one example of a computation unit and a determination unit. The stationary vehicle is one example of a target (for example, target needing vehicle control such as brake control) with which, for example, the own vehicle is to collide, and the upper object is one example of a target (for example, target not needing vehicle control such as brake control) with which, for example, the own vehicle is not to collide.

Among the processes explained in the embodiments, all or a part of the processes that are explained to be executed automatically may be executed manually. Or, among the processes explained in the embodiments, all or a part of the processes that are explained to be executed manually may be executed automatically.

Specific forms of distribution and integration of the units explained in the embodiments may be appropriately changed on the basis of processing loads and processing efficiencies. Moreover, the processing procedures, the controlling procedures, the specific appellations, and the information including various data and parameters, which have been aforementioned or illustrated, may be appropriately changed except a case of a special mention.

According to an aspect of embodiments as described above, for example, it is possible to discriminate between a stationary vehicle and an upper object with high precision.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A radar device that is configured to be mounted on a vehicle and that transmits a radar transmission wave toward a vicinity of the vehicle and subsequently receives each of a plurality of reflected waves that are reflected from a detection target located in the vicinity of the vehicle, wherein the detection target is classified as one of a first target located in a traveling direction of the vehicle and colliding with the vehicle when the vehicle travels in the traveling direction, or a second target located in the traveling direction of the vehicle and not colliding with the vehicle when the vehicle travels in the traveling direction, the radar device comprising:
a processor programmed to:
derive a plurality of parameters according to the detection target and a plurality of detection distances of the detection target based on received signals that are acquired by receiving reflected waves;
calculate a first indicator from likelihood models in which first and second already-known correlations are modeled for each of the plurality of detection distances, the first indicator being based on ratios of:
(i) first likelihoods of the first target; and
(ii) second likelihoods of the second target,
where the first likelihoods and the second likelihoods are based on the derived parameters and the derived plurality of detection distances, the first already-known correlations correlate the parameters and the first likelihoods of the first target with each other, and the second already-known correlations correlate the parameters and the second likelihoods of the second target with each other; and
determine whether the detection target is the first target or the second target based on the calculated first indicator.

2. The radar device according to claim 1, wherein:
the plurality of parameters are calculated at each time when the received signals are acquired, and
the plurality of parameters include:
a lateral position of the detection target relative to the traveling direction of the vehicle;
a relative velocity of the detection target to the vehicle;
a plurality of received powers of the reflected waves;
a received-power difference between reflected waves corresponding to a first transmission wave and a second transmission wave that are included in the radar transmission wave, the first transmission wave and the second transmission wave having respective different transmitting directions;
the received-power difference equalized for each of the detection distances; and
a factor of normal detection and abnormal detection of the detection target based on the received signals.

3. The radar device according to claim 2, wherein:
the processor is programmed to (i) calculate, when a first detection distance of the detection target is a predetermined distance, the first indicator based on first corrected likelihood ratios corrected by using respective first coefficients that linearly regress the plurality of parameters, and (ii) calculate, when the first detection distance of the detection target is other than the predetermined distance, the first indicator based on second corrected likelihood ratios corrected by using respective second coefficients that linearly regress the plurality of parameters; and
the first coefficients have comparatively larger change values according to the detection distances of the detection target than change values of the second coefficients.

4. The radar device according to claim 3, wherein the processor is programmed to:
calculate a second indicator that indicates a decreased amount of the received powers of the reflected waves according to the detection distances of the detection target;
calculate a third indicator that indicates an increased amount of the received powers of the reflected waves according to the detection distances of the detection target; and
determine whether the detection target is the first target or the second target based on at least one of the calculated second and third indicators.

5. The radar device according to claim 4, wherein the processor is programmed to accumulate a plurality of values each obtained by multiplying (i) a difference, which is obtained by subtracting a reference power that is a maximum value among the received powers of the reflected waves up to present processing from one of the received powers of the reflected waves which is acquired in the present processing, by (ii) a detection-distance difference between one of the detection distances of previous processing and one of the detection distances of the present processing, so as to calculate the second indicator.

6. The radar device according to claim 5, wherein the processor is programmed to update, when one of the received powers that is acquired in the present processing is larger than the reference power used in the previous processing, the reference power with the one of the received powers that is acquired in the present processing.

7. The radar device according to claim 2, wherein the processor is programmed to:
calculate a second indicator that indicates a decreased amount of the received powers of the reflected waves according to the detection distances of the detection target;
calculate a third indicator that indicates an increased amount of the received powers of the reflected waves according to the detection distances of the detection target; and
determine whether the detection target is the first target or the second target based on at least one of the calculated second and third indicators.

8. The radar device according to claim 7, wherein the processor is programmed to accumulate a plurality of values each obtained by multiplying (i) a difference, which is obtained by subtracting a reference power that is a maximum value among the received powers of the reflected waves up to present processing from one of the received powers of the reflected waves which is acquired in the present processing, by (ii) a detection-distance difference between one of the detection distances of previous processing and one of the detection distances of the present processing, so as to calculate the second indicator.

9. The radar device according to claim 8, wherein the processor is programmed to update, when one of the received powers that is acquired in the present processing is larger than the reference power used in the previous processing, the reference power with the one of the received powers that is acquired in the present processing.

10. The radar device according to claim 1, wherein:
the processor is programmed to (i) calculate, when a first detection distance of the detection target is a predetermined distance, the first indicator based on first corrected likelihood ratios corrected by using respective first coefficients that linearly regress the plurality of parameters, and (ii) calculate, when the first detection distance of the detection target is other than the predetermined distance, the first indicator based on second corrected likelihood ratios corrected by using respective second coefficients that linearly regress the plurality of parameters; and
the first coefficients have comparatively larger change values according to the detection distances of the detection target than change values of the second coefficients.

11. The radar device according to claim 10, wherein the processor is programmed to:
calculate a second indicator that indicates a decreased amount of the received powers of the reflected waves according to the detection distances of the detection target;
calculate a third indicator that indicates an increased amount of the received powers of the reflected waves according to the detection distances of the detection target; and
determine whether the detection target is the first target or the second target based on at least one of the calculated second and third indicators.

12. The radar device according to claim 11, wherein the processor is programmed to accumulate a plurality of values each obtained by multiplying (i) a difference, which is obtained by subtracting a reference power that is a maximum value among the received powers of the reflected waves up to present processing from one of the received powers of the reflected waves which is acquired in the present processing, by (ii) a detection-distance difference between one of the detection distances of previous processing and one of the detection distances of the present processing, so as to calculate the second indicator.

13. The radar device according to claim 12, wherein the processor is programmed to update, when one of the received powers that is acquired in the present processing is larger than the reference power used in the previous processing, the reference power with the one of the received powers that is acquired in the present processing.

14. The radar device according to claim 1, wherein the processor is programmed to:
calculate a second indicator that indicates a decreased amount of the received powers of the reflected waves according to the detection distances of the detection target;
calculate a third indicator that indicates an increased amount of the received powers of the reflected waves according to the detection distances of the detection target; and
determine whether the detection target is the first target or the second target based on at least one of the calculated second and third indicators.

15. The radar device according to claim 14, wherein the processor is programmed to accumulate a plurality of values each obtained by multiplying (i) a difference, which is obtained by subtracting a reference power that is a maximum value among the received powers of the reflected waves up to present processing from one of the received powers of the reflected waves which is acquired in the present processing, by (ii) a detection-distance difference between one of the detection distances of previous processing and one of the detection distances of the present processing, so as to calculate the second indicator.

16. The radar device according to claim 15, wherein the processor is programmed to update, when one of the received powers that is acquired in the present processing is larger than the reference power used in the previous processing, the reference power with the one of the received powers that is acquired in the present processing.

17. The radar device according to claim 14, wherein the processor is programmed to accumulate a plurality of values each by (i) setting a reference value based on the received powers of the reflected waves when the corresponding detection distance of the detection target is equal to or more than a predefined distance, and (ii) multiplying a difference obtained by subtracting the reference value from one of the received powers of the reflected waves, which is acquired in the present processing by a detection-distance difference between one of the detection distances of previous processing and one of the detection distances of present processing, so as to calculate the third indicator.

18. The radar device according to claim 17, wherein the processor is programmed to accumulate, when the difference obtained by subtracting the reference value from the one of the received powers that is acquired in the present processing is a positive value, the plurality of values each obtained by multiplying the difference by the detection-distance difference, so as to calculate the third indicator.

19. A control method of a radar device configured to be mounted on a vehicle, the method comprising:
- transmitting a radar transmission wave toward a vicinity of the vehicle;
- receiving each of a plurality of reflected waves that are reflected from a detection target located in the vicinity of the vehicle, wherein the detection target is classified as one of a first target located in a traveling direction of the vehicle and colliding with the vehicle when the vehicle travels in the traveling direction, or a second target located in the traveling direction of the vehicle and not colliding with the vehicle when the vehicle travels in the traveling direction;
- deriving a plurality of parameters according to the detection target and a plurality of detection distances of the detection target based on received signals that are acquired by receiving reflected waves;
- calculating a first indicator from likelihood models in which first and second already-known correlations are modeled for each of the plurality of detection distances, the first indicator being based on ratios of:
  - (i) first likelihoods of the first target; and
  - (ii) second likelihoods of the second target,
  - where the first likelihoods and the second likelihoods are based on the derived parameters and the derived plurality of detection distances, the first already-known correlations correlate the parameters and the first likelihoods of the first target with each other, and the second already-known correlations correlate the parameters and the second likelihoods of the second target with each other; and
- determining whether the detection target is the first target or the second target based on the calculated first indicator.

* * * * *